(12) United States Patent
Iwase et al.

(10) Patent No.: US 11,899,355 B2
(45) Date of Patent: Feb. 13, 2024

(54) OPTICAL UNIT

(71) Applicant: NIDEC CORPORATION, Kyoto (JP)

(72) Inventors: Takayuki Iwase, Kyoto (JP); Tomohiro Egawa, Kyoto (JP); Keishi Otsubo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 225 days.

(21) Appl. No.: 17/473,959

(22) Filed: Sep. 13, 2021

(65) Prior Publication Data
US 2022/0082902 A1 Mar. 17, 2022

(30) Foreign Application Priority Data
Sep. 14, 2020 (JP) ................................. 2020-154050

(51) Int. Cl.
*G03B 5/06* (2021.01)
*G02B 26/08* (2006.01)
*G03B 17/12* (2021.01)

(52) U.S. Cl.
CPC ........... *G03B 5/06* (2013.01); *G02B 26/0816* (2013.01); *G03B 17/12* (2013.01); *G03B 2205/0023* (2013.01); *G03B 2205/0069* (2013.01)

(58) Field of Classification Search
CPC .............. G03B 5/06; G03B 2205/0023; G02B 26/0816
See application file for complete search history.

(56) References Cited

U.S. PATENT DOCUMENTS

| 10,488,631 | B2 | 11/2019 | Bachar et al. | |
|---|---|---|---|---|
| 10,516,773 | B2 | 12/2019 | Yoon et al. | |
| 10,678,062 | B2 | 6/2020 | Im et al. | |
| 2018/0224665 | A1* | 8/2018 | Im | G02B 7/08 |
| 2019/0129197 | A1 | 5/2019 | Kim et al. | |
| 2019/0230255 | A1 | 7/2019 | Fu et al. | |
| 2020/0218082 | A1* | 7/2020 | Choi | G03B 17/17 |
| 2020/0333622 | A1 | 10/2020 | Fujisaki et al. | |
| 2020/0363626 | A1 | 11/2020 | Seo et al. | |
| 2020/0400464 | A1* | 12/2020 | Yedid | G02B 7/18 |
| 2021/0072530 | A1 | 3/2021 | Tsai et al. | |

FOREIGN PATENT DOCUMENTS

JP 2012118336 A 6/2012

* cited by examiner

*Primary Examiner* — Clayton E. LaBalle
*Assistant Examiner* — Diana Hancock
(74) *Attorney, Agent, or Firm* — HAUPTMAN HAM, LLP

(57) ABSTRACT

An optical unit includes an optical element, a holder, a first support portion, a second support portion, a first swing mechanism, and a second swing mechanism. The holder holds the optical element. The first support portion supports the holder so as to be swingable about a first swing axis. The second support portion supports the first support portion so as to be swingable about the second swing axis. The second swing mechanism includes a second magnet and a second coil. The second magnet is arranged on the first support portion. The second coil is arranged on the second support portion.

13 Claims, 24 Drawing Sheets

OPTICAL UNIT

CROSS-REFERENCE TO RELATED APPLICATIONS

The present invention claims priority under 35 U.S.C. § 119 to Japanese Patent Application No. 2020-154050 filed on Sep. 14, 2020, the entire content of which is incorporated herein by reference.

FIELD OF THE INVENTION

The present disclosure relates to an optical unit.

BACKGROUND

An image blur may occur due to camera shake during shooting of a still image or moving image with a camera. Further, an image stabilizer has been put into practical use to enable shooting of a clear image by suppressing the image blur. When the camera shakes, the image stabilizer suppresses the image blur by correcting the orientation of a camera module according to the camera shake.

Conventionally, there is known a prism device which includes a prism, a prism seat on which the prism is installed, and a support shaft, and is used for an imaging module. The prism seat is rotatable about one support shaft.

However, the orientation of the prism is corrected about only the one support shaft in the conventional prism device, and thus, it is difficult to suppress the image blur depending on the direction of the camera shake.

SUMMARY

An exemplary optical unit of the present disclosure includes an optical element, a holder, a first support portion, a second support portion, a first swing mechanism, and a second swing mechanism. The optical element changes a traveling direction of light. The holder holds the optical element. The first support portion supports the holder so as to be swingable about a first swing axis. The second support portion supports the first support portion so as to be swingable about a second swing axis intersecting the first swing axis. The first swing mechanism swings the holder about the first swing axis with respect to the first support portion. The second swing mechanism swings the first support portion about the second swing axis with respect to the second support portion. The first swing mechanism includes a first magnet and a first coil. The first magnet is arranged on the holder. The first coil is arranged on the second support portion. The second swing mechanism includes a second magnet and a second coil. The second magnet is arranged on the first support portion. The second coil is arranged on the second support portion.

Another exemplary optical unit of the present disclosure includes an optical element, a holder, a first support portion, a second support portion, a first swing mechanism, and a second swing mechanism. The optical element changes a traveling direction of light. The holder holds the optical element. The first support portion supports the holder so as to be swingable about a first swing axis. The second support portion supports the first support portion so as to be swingable about a second swing axis intersecting the first swing axis. The first swing mechanism swings the holder about the first swing axis with respect to the first support portion. The second swing mechanism swings the first support portion about the second swing axis with respect to the second support portion.

The above and other elements, features, steps, characteristics and advantages of the present disclosure will become more apparent from the following detailed description of the preferred embodiments with reference to the attached drawings.

DETAILED DESCRIPTION

Figure 1:
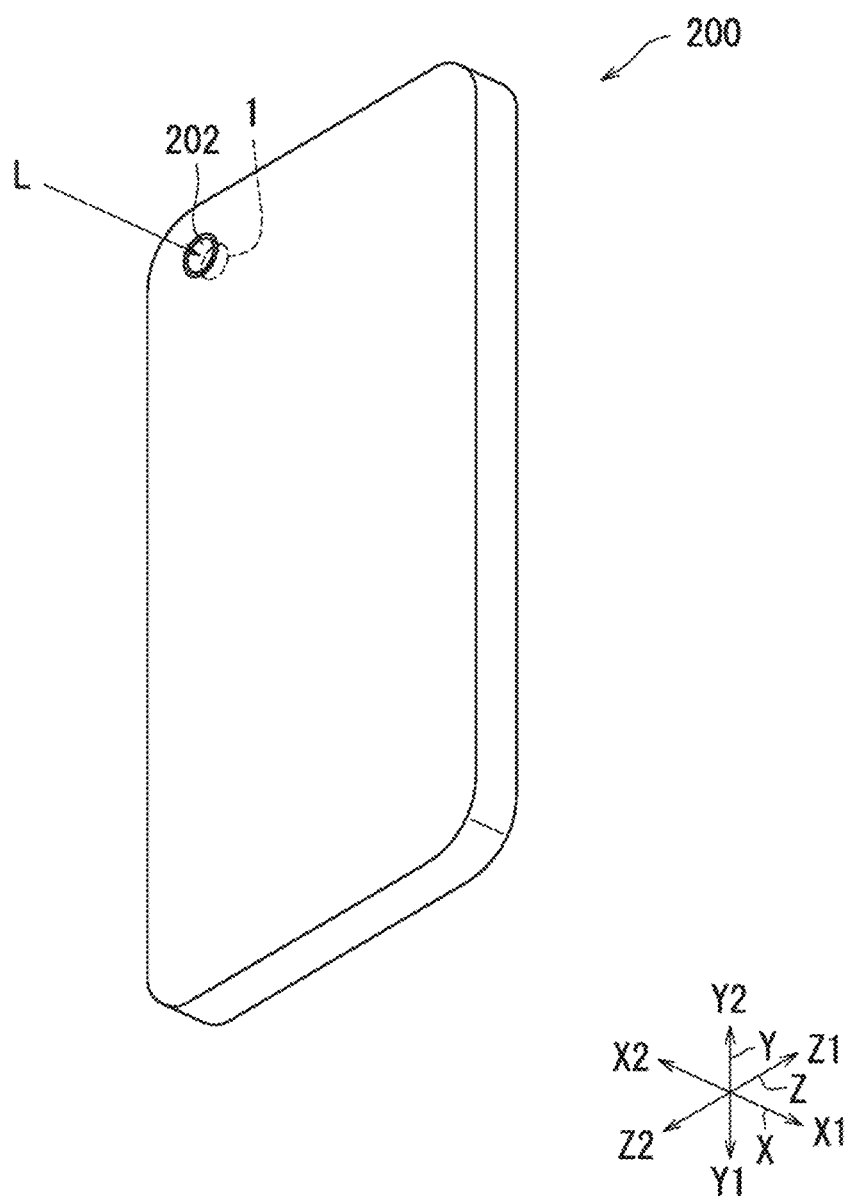
FIG. 1 is a perspective view schematically illustrating a smartphone including an optical unit according to an embodiment of the present disclosure.

Exemplary embodiments of the present disclosure will be described below with reference to the drawings. In the drawings, the same or corresponding portions are denoted by the same reference characters and description thereof will not be repeated.

In the present specification, a first direction X, a second direction Y, and a third direction Z intersecting each other are appropriately described for easy understanding. In the present specification, the first direction X, the second direction Y, and the third direction Z, are orthogonal to each other, but are not necessarily orthogonal to each other. Further, one side in the first direction is referred to as one side X1 in the first direction X, and the other side in the first direction is referred to as the other side X2 in the first direction X. Further, one side in the second direction is referred to as one side Y1 in the second direction Y, and the other side in the second direction is referred to as the other side Y2 in the second direction Y. Further, one side in the third direction is referred to as one side Z1 in the third direction Z, and the other side in the third direction is referred to as the other side Z2 in the third direction Z. Further, the first direction X is sometimes described as an upper and lower direction for convenience. The one side X1 in the first direction X indicates a downward direction, and the other side X2 in the first direction X indicates an upward direction. The upper and lower direction, the upward direction, and the downward direction are defined for convenience of the description, but do not necessarily match with a vertical direction. Further, the upper and lower direction is defined only for convenience of the description, but does not limit an orientation during use and assembly of an optical unit according to the present disclosure.

First, an example of an application of an optical unit 1 will be described with reference to FIG. 1. FIG. 1 is a perspective view schematically illustrating a smartphone 200 including the optical unit 1 according to an embodiment of the present disclosure. The optical unit 1 reflects incident light in a specific direction. As illustrated in FIG. 1, the optical unit 1 is suitably used as, for example, an optical component of the smartphone 200. Note that the application of the optical unit 1 is not limited to the smartphone 200, and can be used for various devices such as a digital camera and a video camera.

The smartphone 200 includes a lens 202 on which light is incident. In the smartphone 200, the optical unit 1 is arranged inside the lens 202. When light L enters the inside of the smartphone 200 via the lens 202, a traveling direction of the light L is changed by the optical unit 1. The light L is imaged by an imaging element (not illustrated) via a lens (not illustrated).

Figure 2:
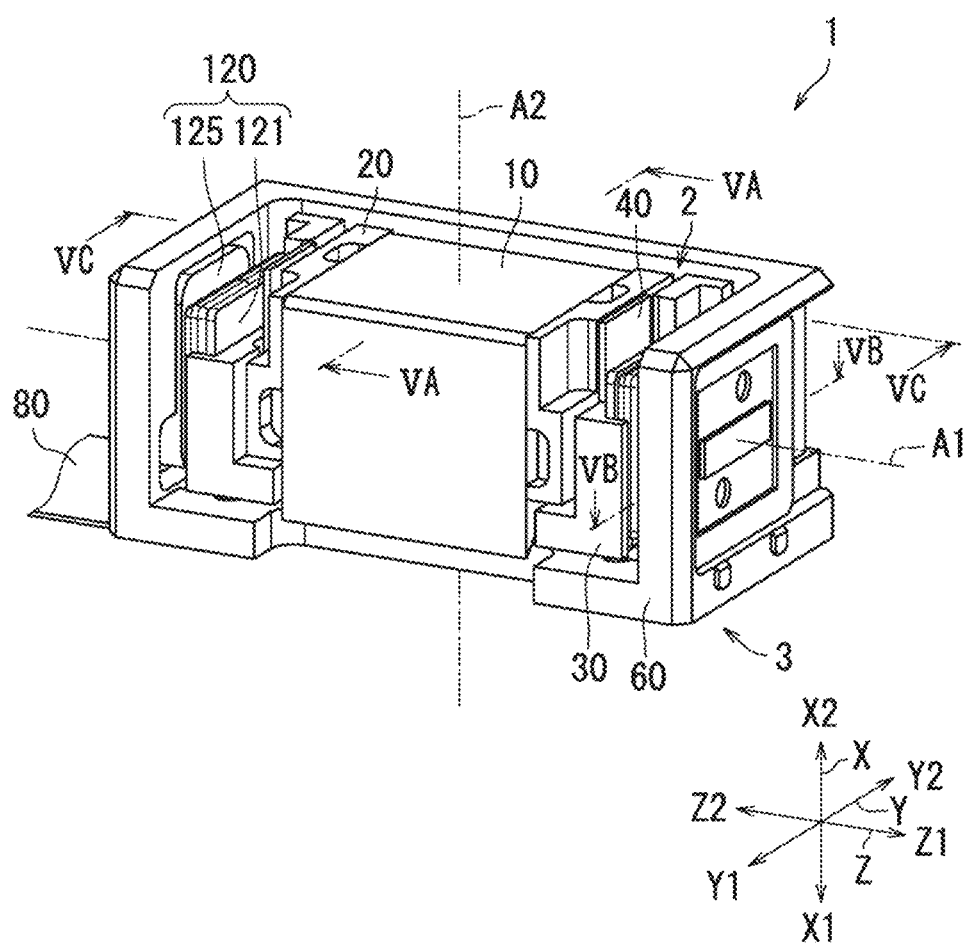
FIG. 2 is a perspective view illustrating the optical unit of the present embodiment.
Figure 3:
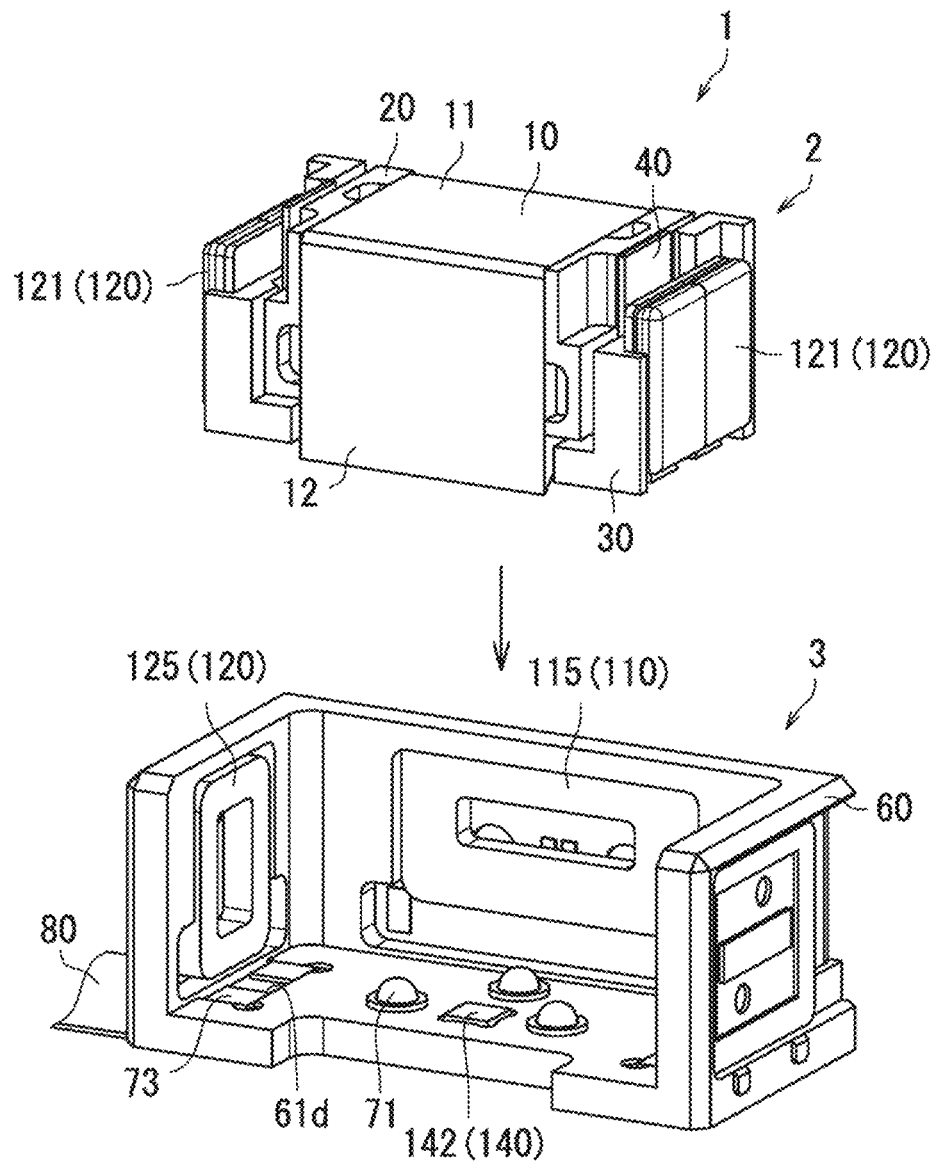
FIG. 3 is an exploded perspective view of the optical unit according to the present embodiment disassembled into a movable body and a support body.
Figure 3:
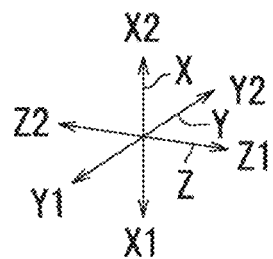

Next, the optical unit 1 will be described with reference to FIGS. 2 to 14. FIG. 2 is a perspective view illustrating the optical unit 1 of the present embodiment. FIG. 3 is an exploded perspective view of the optical unit 1 according to the present embodiment disassembled into a movable body 2 and a support body 3. As illustrated in FIGS. 2 and 3, the optical unit 1 includes at least an optical element 10, a holder 20, a first support portion 30, a second support portion 60, a first swing mechanism 110, and a second swing mechanism 120. In the present embodiment, the optical unit 1 further includes a first pre-load portion 40 and a second pre-load portion 140. In the present embodiment, the optical unit 1 further includes a flexible printed circuit (FPC) 80. Details will be described below.

Figure 4:
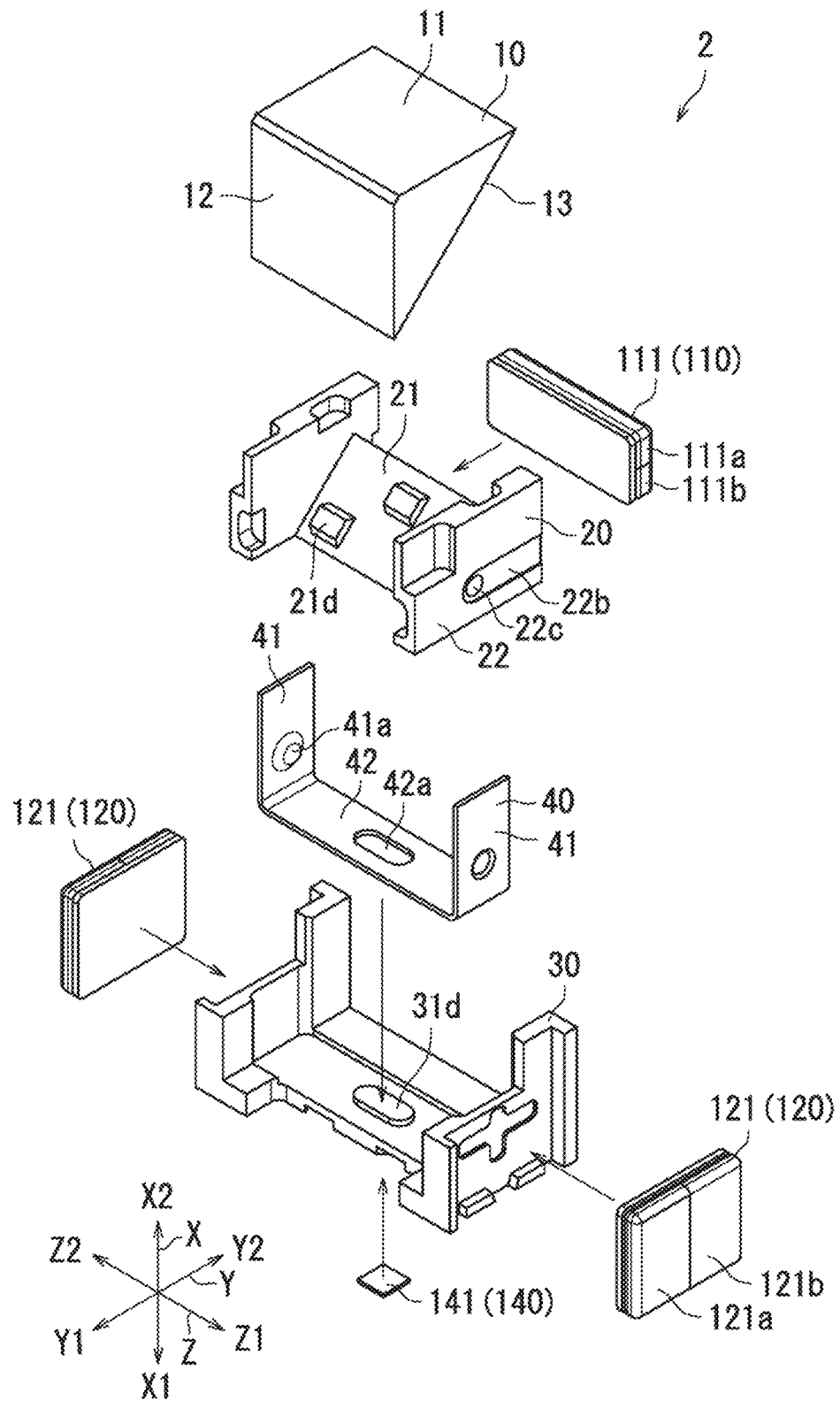
FIG. 4 is an exploded perspective view of the movable body of the optical unit according to the present embodiment.

FIG. 4 is an exploded perspective view of the movable body 2 of the optical unit 1 according to the present embodiment. As illustrated in FIGS. 2 to 4, the optical unit 1 includes the movable body 2 and the support body 3. The support body 3 supports the movable body 2 so as to be swingable about a second swing axis A2.

The movable body 2 includes the optical element 10, the holder 20, the first support portion 30, and the first pre-load portion 40. The optical element 10 changes the traveling direction of light. The holder 20 holds the optical element 10. The first support portion 30 supports the holder 20 and the optical element 10 so as to be swingable about a first swing axis A1. Further, the first support portion 30 is supported by the second support portion 60 of the support body 3 so as to be swingable about the second swing axis A2.

That is, the holder 20 is swingable with respect to the first support portion 30, and the first support portion 30 is swingable with respect to the second support portion 60. Therefore, the optical element 10 can be swung about each of the first swing axis A1 and the second swing axis A2, the orientation of the optical element 10 can be corrected about each of the first swing axis A1 and the second swing axis A2. Thus, an image blur can be suppressed in more directions. As a result, the correction accuracy can be improved as compared with a case in which the optical element 10 is swung about only one swing axis. Note that the first swing axis A1 is also referred to as a pitching axis. The second swing axis A2 is also referred to as a roll axis.

The first swing axis A1 is an axis extending along the third direction Z. The second swing axis A2 is an axis extending along the first direction X. Therefore, the optical element 10 can be swung about the first swing axis A1 intersecting the first direction N and the second direction Y. Further, the optical element 10 can be swung about the second swing axis A2 extending along the first direction X. Thus, the orientation of the optical element 10 can be appropriately corrected. Note that the first direction X and the second direction Y are directions along the traveling direction of the light L.

The first support portion 30 supports the holder 20 in the third direction Z. Therefore, the first support portion 30 can be easily swung about the first swing axis A1 extending along the third direction Z. Specifically, the first support portion 30 supports the holder 20 in the third direction Z via the first pre-load portion 40 in the present embodiment.

Figure 5A:
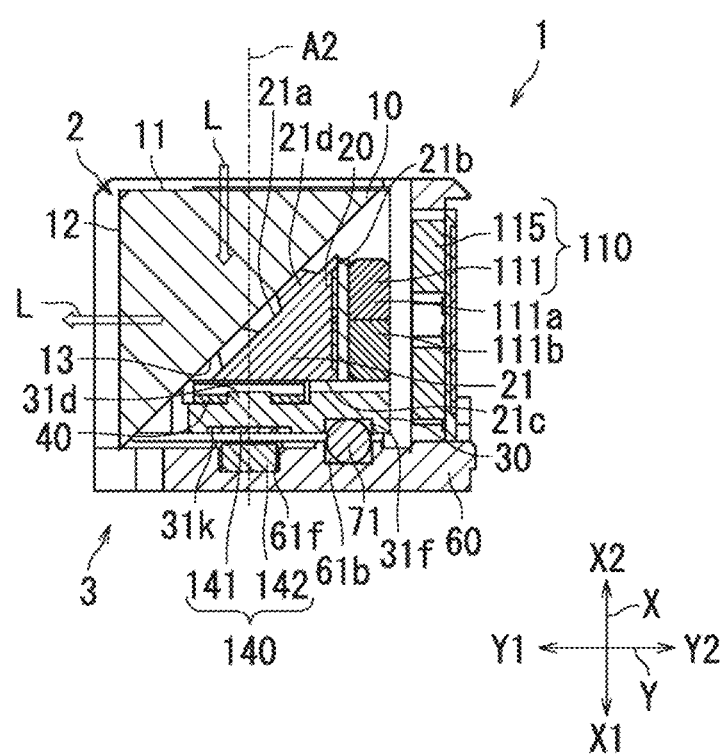
FIG. 5A is a cross-sectional view taken along line VA-VA of FIG. 2.
Figure 5B:
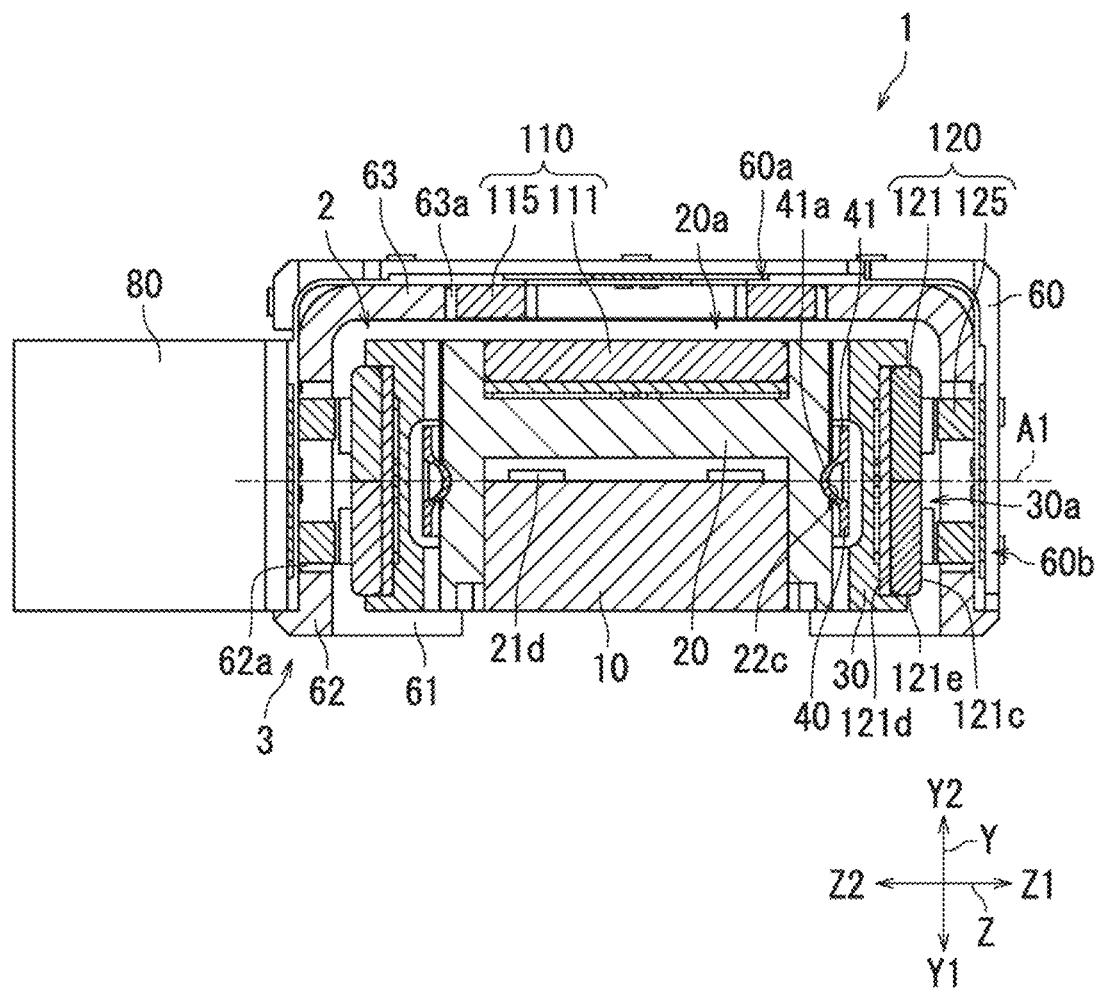
FIG. 5B is a cross-sectional view taken along line VB-VB of FIG. 2.
Figure 5C:
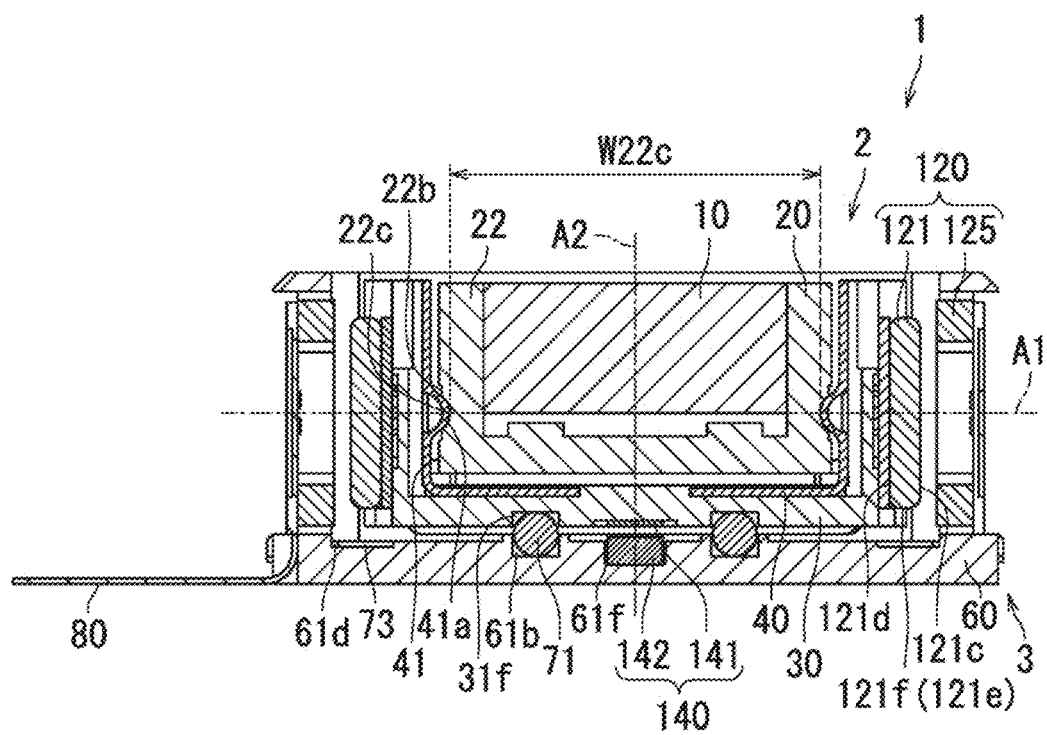
FIG. 5C is a cross-sectional view taken along line VC-VC of FIG. 2.
Figure 5C:
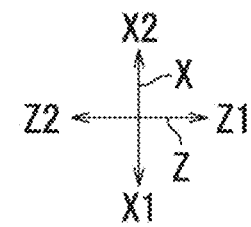
Figure 6:
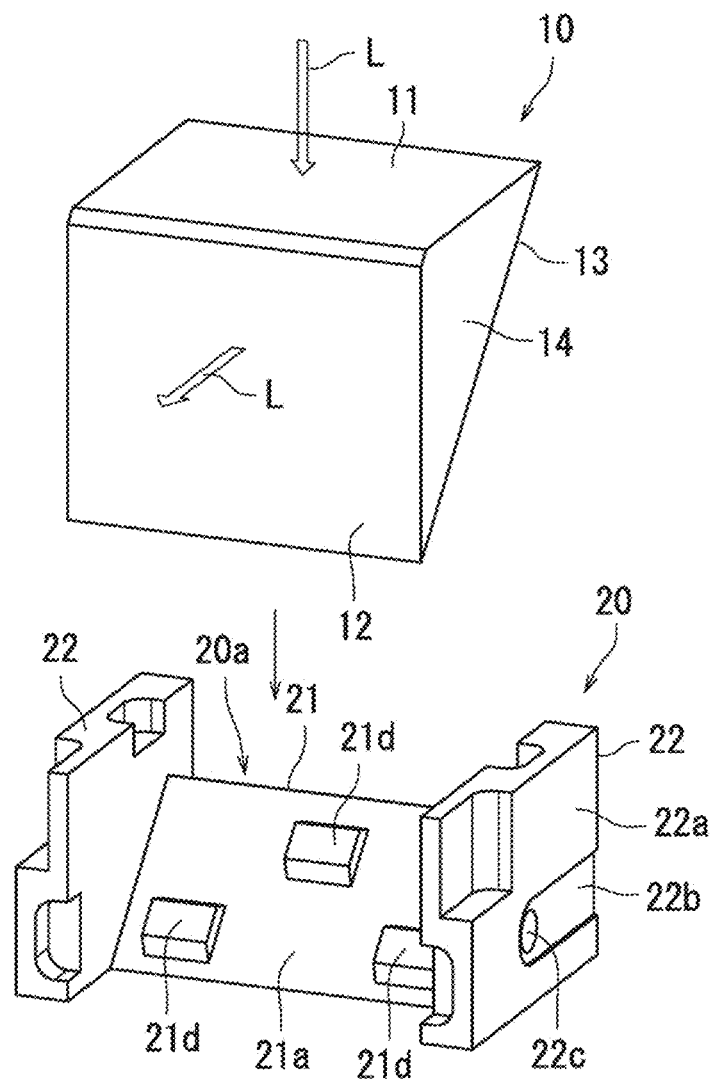
FIG. 6 is an exploded perspective view of an optical element and a holder of the optical unit according to the present embodiment.
Figure 6:
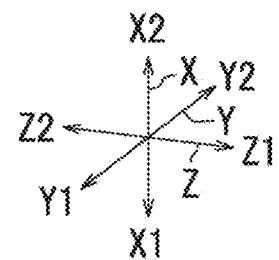

FIG. 5A is a cross-sectional view taken along line VA-VA of FIG. 2. FIG. 5B is a cross-sectional view taken along line VB-VB of FIG. 2. FIG. 5C is a cross-sectional view taken along line VC-VC of FIG. 2. FIG. 6 is an exploded perspective view of the optical element 10 and the holder 20 of the optical unit 1 according to the present embodiment. As illustrated in FIGS. 5A to 5C and 6, the optical element 10 includes a prism. The prism is made of a transparent material that has a higher refractive index than air. The optical element 10 has a substantially triangular prism shape. Specifically, the optical element 10 has a light incident surface 11, a light emission surface 12, a reflective surface 13, and a pair of side surfaces 14. The light L is incident on the light incident surface 11. The light emission surface 12 is connected to the light incident surface 11. The light emission surface 12 is arranged perpendicular to the light incident surface 11. The reflective surface 13 is connected to the light incident surface 11 and the light emission surface 12. The reflective surface 13 is inclined by about 45 degrees with respect to each of the light incident surface 11 and the light emission surface 12. The reflective surface 13 reflects the light L, which is incident from the light incident surface 11 and travels to the one side X1 in the first direction X, to the one side Y1 in the second direction Y intersecting the first direction X. The pair of side surfaces 14 are connected to the light incident surface 11, the light emission surface 12, and the reflective surface 13.

The holder 20 is made of, for example, resin. The holder 20 includes a holder body 21 and a pair of side surface portions 22. The holder 20 further includes a pair of opposing side surfaces 22a, a groove 22b, and an axial recess 22c.

Specifically, the holder body 21 has an opposing surface 21a and at least three support protrusions 21d. The holder body 21 has three support protrusions 21d in the present embodiment. The opposing surface 21a opposes the optical element 10. The opposing surface 21a is inclined by about 45 degrees with respect to an incident direction of the light L. The incident direction of the light L is a direction toward the one side X1 in the first direction X. The support protrusion 21d is arranged on the opposing surface 21a. The support protrusion 21d protrudes from the opposing surface 21a toward the optical element 10. The support protrusion 21d comes into contact with the reflective surface 13 of the optical element 10 to support the optical element 10. Therefore, the optical element 10 is supported against the three support protrusions 21d by the holder 20. Thus, the optical element 10 can be stably supported by the holder 20 compared with a case where the optical element 10 is supported by four or more points.

The holder body 21 further has a back surface 21b and a lower surface 21c. The back surface 21b is connected to an end of the opposing surface 21a on an opposite side to an emission direction of the light L. Note that the "emission direction of the light L" is the one side Y1 in the second direction Y. Further, the "end on the opposite side to the emission direction of the light L" is an end on the other side Y2 in the second direction Y. The lower surface 21c is connected to the opposing surface 21a and the back surface 21b.

The pair of side surface portions 22 are arranged at both ends of the holder body 21 in the third direction Z. The pair of side surface portions 22 have shapes symmetrical to each other in the third direction Z. The pair of opposing side surfaces 22a are arranged on the pair of side surface portions 22, respectively. The pair of opposing side surfaces 22a oppose the pair of side surface portions 41 of the first pre-load portion 40, respectively. A detailed structure of the side surface portion 41 will be described later. The groove 22b is arranged on the opposing side surface 22a. The groove 22b is recessed toward the inside of the holder 20. The groove 22b extends to the other side Y2 in the second direction Y. The axial recess 22c is arranged inside the groove 22b. The axial recess 22c is recessed toward the inside of the holder on the first swing axis A1. The axial recess 22c accommodates at least a part of an axial protrusion 41a of the first pre-load portion 40. A detailed structure of the axial protrusion 41a will be described later. The axial recess 22c has at least a part of a concave-shaped spherical surface.

The first pre-load portion 40 is arranged on at least one of the holder 20 and the first support portion 30. The first pre-load portion 40 applies a pre-load to at least the other of the holder 20 and the first support portion 30 in an axial direction of the first swing axis A1. Therefore, the holder 20 can be prevented from being displaced in the axial direction of the first swing axis A1. The axial direction of the first swing axis A1 is a direction along the third direction. Note that "applying the pre-load" means applying a load in advance in the present, specification and claims.

Figure 7:
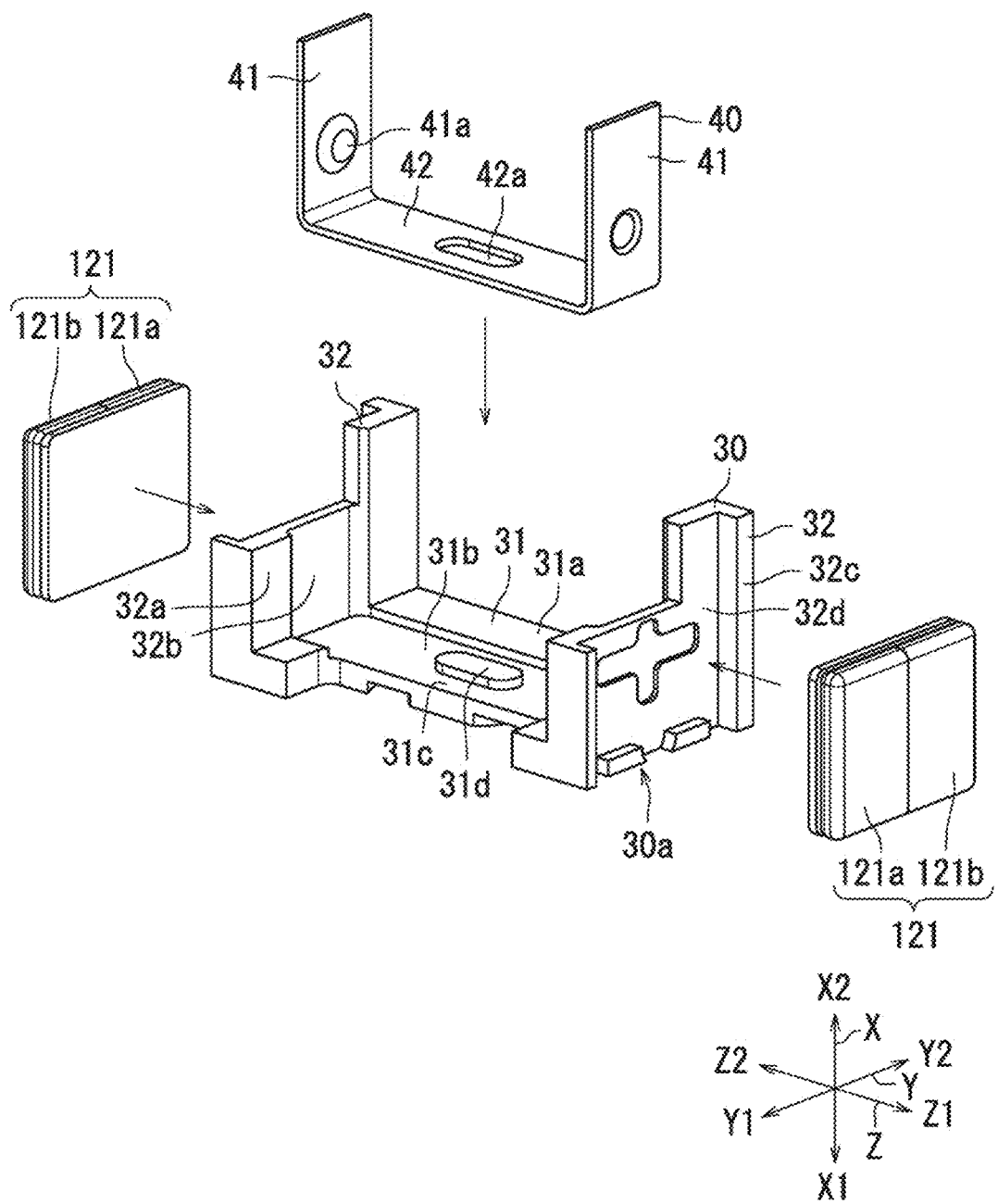
FIG. 7 is an exploded perspective view of a first pre-load portion, a first support portion, and a second magnet of the optical unit according to the present embodiment.

FIG. 7 is an exploded perspective view of the first pre-load portion 40, the first support portion 30, and a second magnet 121 of the optical unit 1 according to the present embodiment. In the present embodiment, the first pre-load portion 40 is formed of one member as illustrated in FIGS. 5C and 7. The first pre-load portion 40 is arranged on the first support portion 30. The first pre-load portion 40 includes the pair of side surface portions 41 and a connection portion 42 that connects the pair of side surface portions 41 to each other. The pair of side surface portions 41 have shapes symmetrical to each other in the third direction Z. The pair of side surface portions 41 sandwich the holder 20 in the axial direction of the first swing axis A1. Therefore, the pre-load can be applied to the holder 20 in the axial direction of the first swing axis A1 with a simple configuration.

The side surface portion 41 has the axial protrusion 41a. The axial protrusion 41a protrudes toward the holder 20 on the first swing axis A1. The axial protrusion 41a has at least a part of a spherical surface. A part of the axial protrusion 41a is accommodated in the axial recess 22c. Therefore, the axial protrusion 41a and the axial recess 22c are in point contact with each other, the holder 20 can be stably supported by the first pre-load portion 40. Further, the pair of axial protrusions 41a of the first pre-load portion 40 sandwich the pair of axial recesses 22c of the holder 20 in the third direction Z. The holder 20 is supported by the first pre-load portion 40 at two contact points in contact with the axial protrusion 41a. Therefore, the holder 20 can swing about the first swing axis A1 passing through the two contact points.

Figure 8:
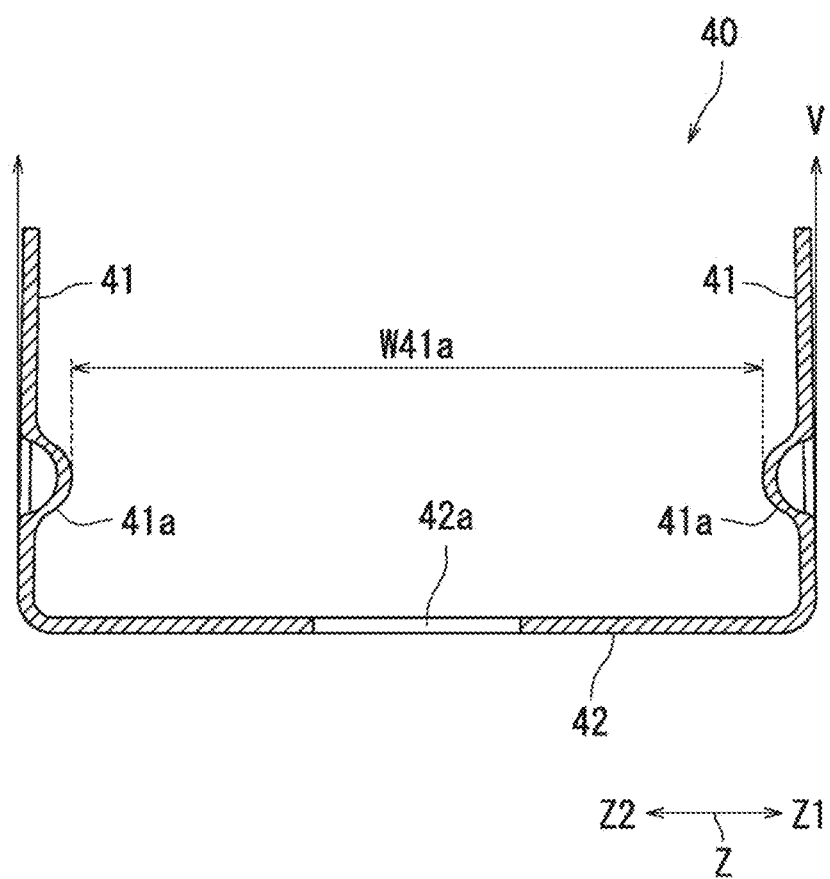
FIG. 8 is a cross-sectional view of the first pre-load portion of the optical unit according to the present embodiment.

FIG. 8 is a cross-sectional view of the first pre-load portion 40 of the optical unit 1 according to the present embodiment. As illustrated in FIG. 8, the pair of side surface portions 41 are inclined inward with respect to the direction V perpendicular to the connection portion 42 in a state in which the first pre-load portion 40 is not attached to the holder 20. The distance between the pair of side surface portions 41 decreases as a distance from the connection portion 42 increases. Therefore, a larger pre-load can be applied to the holder 20 in the axial direction of the first swing axis A1 as compared with a case where the distance between the pair of side surface portions 41 increases or is constant as the distance from the connection portion 42 increases. Further, a distance W41a between the axial protrusions 41a is smaller than a distance W22c (see FIG. 5C) between the axial recesses 22c of the holder 20 in the state in which the first pre-load portion 40 is not attached to the holder 20.

The pair of side surface portions 41 and the connection portion 42 are formed of a single member. The first pre-load portion 40 can be attached to the holder 20 by pushing and spreading the pair of side surface portions 41 outward. That is, the first pre-load portion 40 can be attached to the holder 20 by pushing and spreading the pair of side surface portions 41 to the one side 21 and the other side Z2 in the third direction Z. Since the holder 20 has the groove 22b (see FIG. 6) in the present embodiment, the first pre-load portion 40 can be easily attached to the holder 20 by moving the axial protrusion 41a along the groove 22b. The first pre-load portion 40 is preferably made of metal. The first pre-load portion 40 may be made of resin.

As illustrated in FIG. 7, the connection portion 42 has a fitting hole 42a to be fitted to a fitting protrusion 31d of the first support portion 30. The fitting hole 42a is arranged at the center of the connection portion 42 in the third direction Z. The fitting hole 42a is provided to fix the first pre-load portion 40 to the first support portion 30 in the present embodiment.

Figure 9:
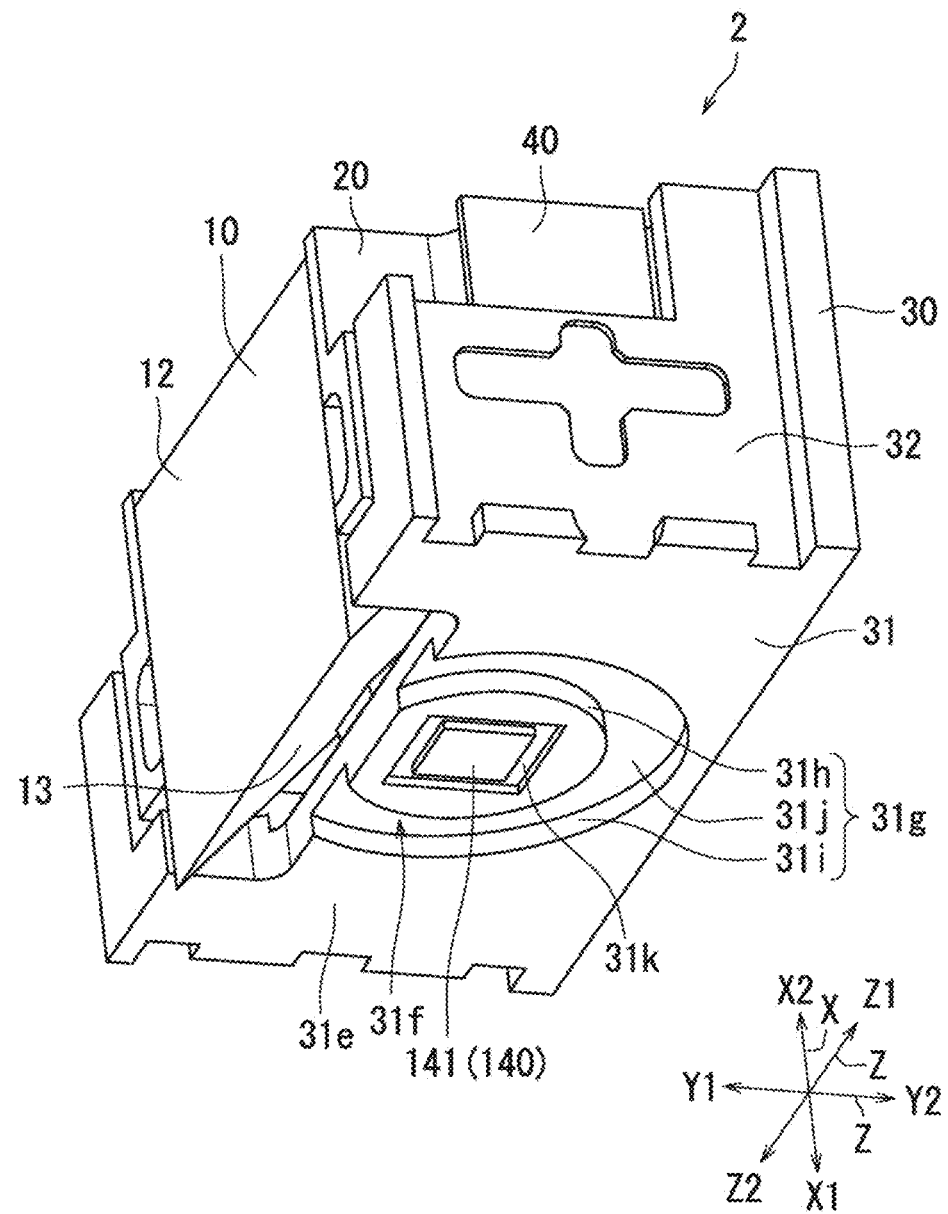
FIG. 9 is a perspective view illustrating the movable body of the optical unit according to the present embodiment.
Figure 10:
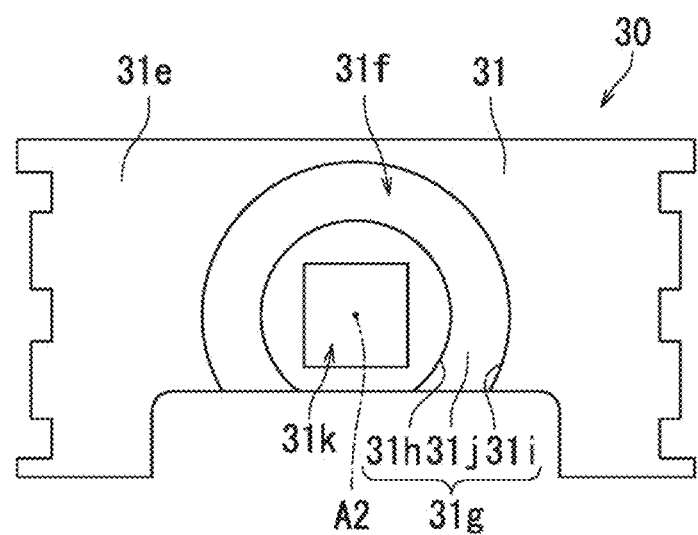
FIG. 10 is a view illustrating the first support portion of the optical unit according to the present embodiment viewed from one side X1 in a first direction X.
Figure 11:
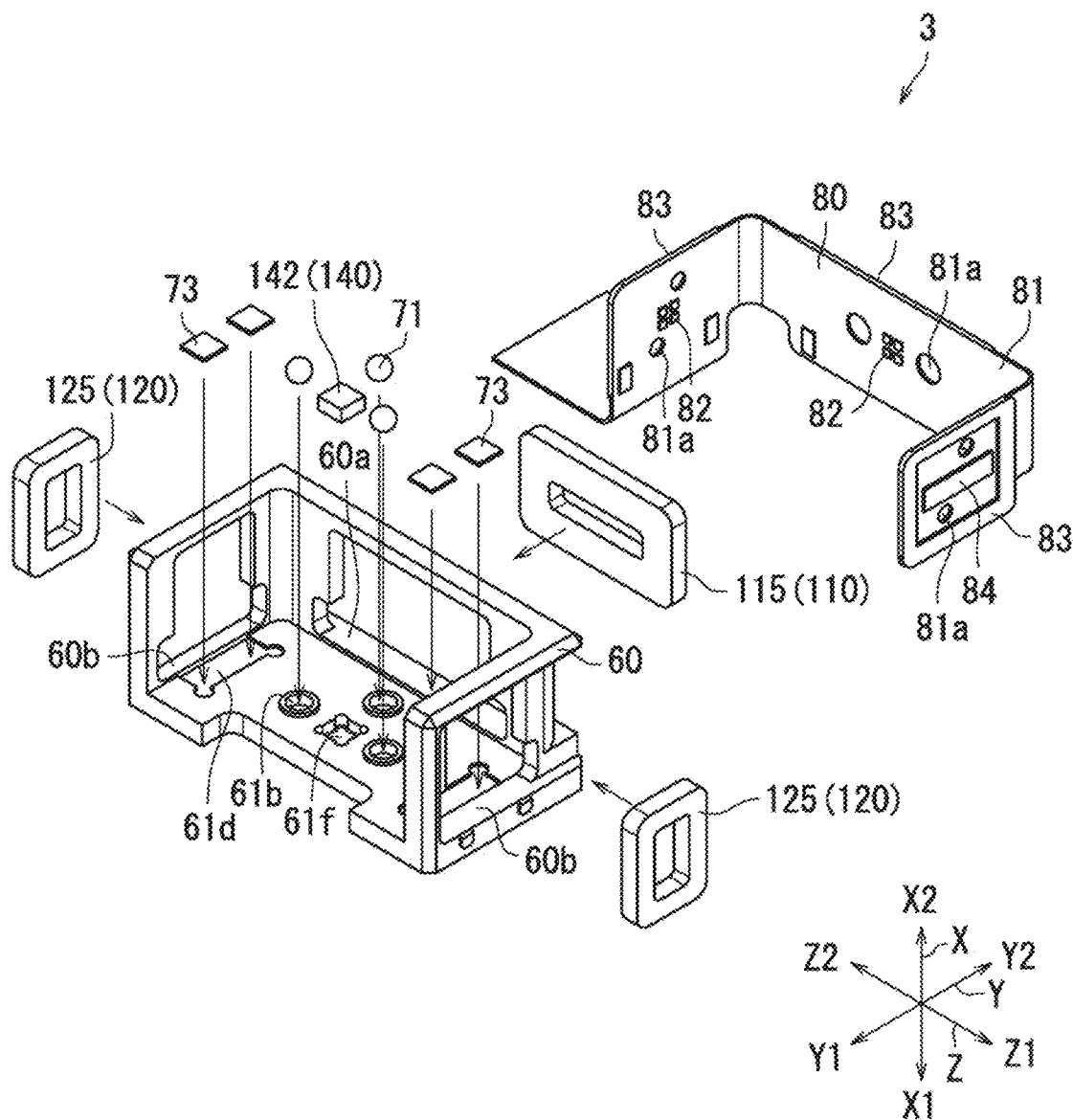
FIG. 11 is an exploded perspective view of the support body of the optical unit according to the present embodiment.
Figure 12:
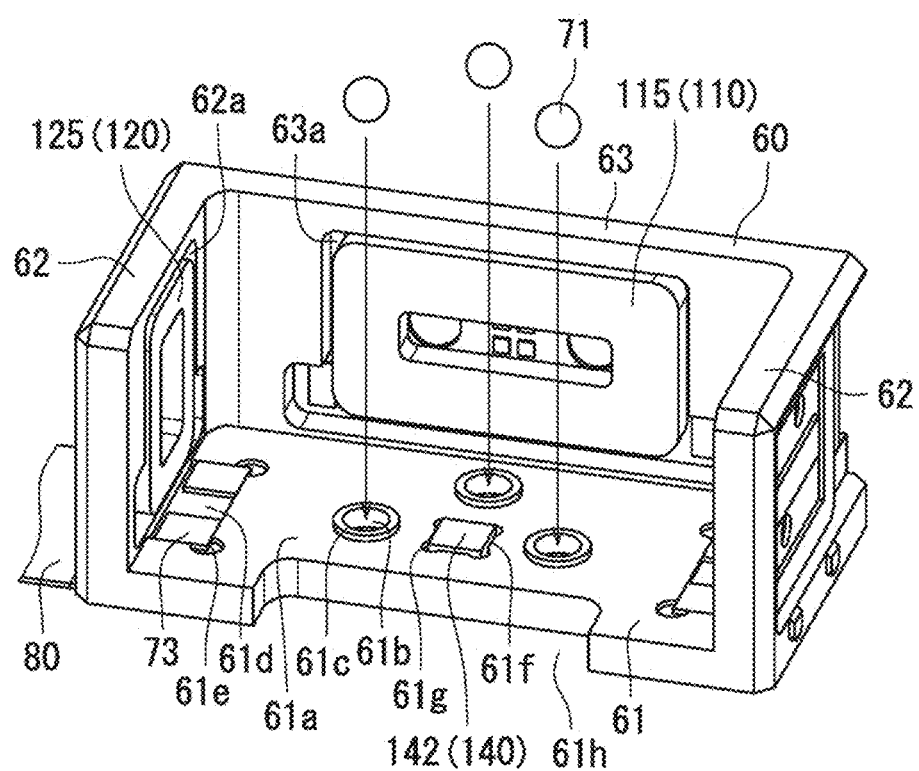
FIG. 12 is a perspective view illustrating the periphery of a second support portion of the optical unit according to the present embodiment.
Figure 12:
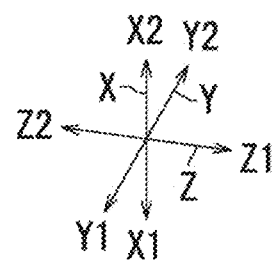
Figure 13:
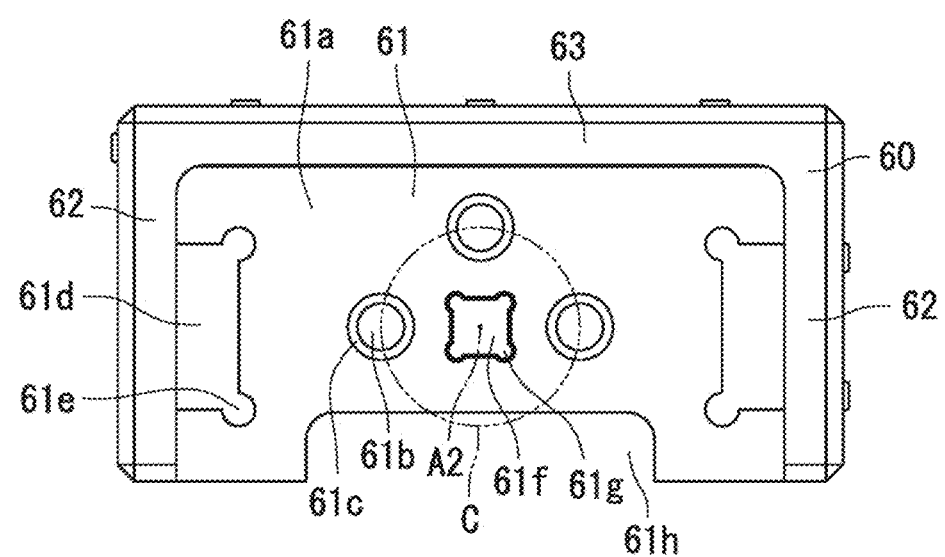
FIG. 13 is a view illustrating the second support portion of the optical unit according to the present embodiment viewed from the other side X2 in the first direction X.

FIG. 9 is a perspective view illustrating the movable body 2 of the optical unit 1 according to the present embodiment. FIG. 10 is a view illustrating the first support portion 30 of the optical unit 1 according to the present embodiment viewed from the one side X1 in the first direction X. FIG. 11 is an exploded perspective view of the support body 3 of the optical unit 1 according to the present embodiment. FIG. 12 is a perspective view illustrating the periphery of the second support portion 60 of the optical unit 1 according to the present embodiment. As illustrated in FIGS. 9 to 12, one of the first support portion 30 and the second support portion 60 has at least three axial center protrusions 71 protruding toward the other of the first support portion 30 and the second support portion 60. The number of the axial center protrusions 71 is three in the present embodiment. Therefore, the movable body 2 is supported by the three axial center protrusions 71, and thus, the movable body 2 can be stably supported as compared with a case where the movable body 2 is supported by four or more axial center protrusions 71.

The other of the first support portion 30 and the second support portion 60 has an axial center recess 31f recessed in a direction opposite to the axial center protrusion 71. The axial center recess 31f comes into contact with the axial center protrusion 71. Further, the axial center recess 31f forms at least a part of a circle centered on the second swing axis A1. Therefore, the at least three axial center protrusions 71 move along an inner surface 31g of the axial center recess 31f. Thus, the first support portion 30 can be stably swung with respect to the second support portion 60 about the second swing axis A2.

In the present embodiment, the first support portion 30 has the axial center recess 31f, and the second support portion 60 has the axial center protrusion 71. Therefore, in a case where the axial center protrusion 71 is a sphere, the first support portion 30 can be assembled to the second support portion 60 in a state in which the sphere is arranged on the second support portion 60, so that the assembly work can be facilitated.

Specifically, as illustrated in FIGS. 7 and 9, the first support portion 30 includes a support body 31 and a pair of side surface portions 32. The support body 31 includes an upper opposing surface 31a, a recess 31b, and a fitting protrusion 31d. The upper opposing surface 31a opposes the holder 20 in the first direction X. The recess 31b is arranged on the upper opposing surface 31a. The recess 31b is slightly larger than the connection portion 42 of the first pre-load portion 40. The recess 31b accommodates the connection portion 42. The recess 31b has a bottom surface 31c. The fitting protrusion 31d is arranged on the bottom surface 31c.

The fitting protrusion 31d protrudes from the bottom surface 31c toward the holder 20. The connection portion 42 of the first pre-load portion 40 is arranged on the bottom surface 31c. The fitting protrusion 31d has a shape extending along the first swing axis A1. The fitting protrusion 31d has, for example, an oval shape or a rectangular shape. The fitting protrusion 31d is arranged in the fitting hole 42a and is fitted to the fitting hole 42a. Therefore, the first pre-load portion 40 can be fixed to the first support portion 30 by fitting the fitting hole 42a of the connection portion 42 to the fitting protrusion 31d of the first support portion 30. Note that, in the present embodiment, the first support portion 30 includes the fitting protrusion 31d, and the connection portion 42 includes the fitting hole 42a. However, the first support portion 30 may have a fitting hole, and the connection portion 42 may have a fitting protrusion. In the present embodiment, the first support portion 30 and the first pre-load portion 40 are fixed by fitting. However, the first support portion 30 and the first pre-load portion 40 may be fixed by a method other than fitting. For example, the first support portion 30 and the first pre-load portion 40 may be fixed by an adhesive. Further, the first support portion 30 and the first pre-load portion 40 may be integrally formed by insert molding or the like.

The pair of side surface portions 32 are arranged at both ends of the support body 31 in the third direction Z. The pair of side surface portions 32 have shapes symmetrical to each other in the third direction Z. The side surface portion 32 has an inner side surface 32a and a recess 32b. The inner side surface 32a opposes the holder 20 in the third direction Z. The recess 32b is arranged on the inner side surface 32a. The recess 32b accommodates a part of the side surface portion 41 of the first pre-load portion 40.

The side surface portion 32 further has an outer side surface 32c and an accommodating recess 32d. The outer side surface 32c opposes the outer side in the third direction Z. The accommodating recess 32d is arranged on the outer side surface 32c. The accommodating recess 32d accommodates at least a part of the second magnet 121 of the second swing mechanism 120.

The support body 31 further includes a lower opposing surface 31e and the axial center recess 31f. The lower opposing surface 31e opposes the second support portion 60 of the support body 3 in the first direction X. The axial center recess 31f is arranged on the lower opposing surface 31e. The axial center recess 31f is arranged on the one side X1 in the first direction X with respect to the reflective surface 13 of the optical element 10. Therefore, the axial center recess 31f can be arranged without blocking an optical path.

The axial center recess 31f forms at least a part of the circle centered on the second swing axis A2 as described above. The axial center recess 31f has a shape obtained by cutting out an end on the one side Y1 in the second direction Y of the circle centered on the second swing axis A2. A part of the reflective surface 13 protrudes toward the one side X1 in the first direction X and the one side Y1 in the second direction Y with respect to the lower opposing surface 31e. Therefore, it is possible to prevent the optical element 10 from coming into contact with a portion of the first support portion 30 where the axial center recess 31f is arranged. That is, a space for arranging the optical element 10 can be secured. Note that the "circle" includes a "circumference" and also includes an "inside surrounded by the circumference" in the present specification and the claims.

As illustrated in FIGS. 9 and 10, the axial center recess 31f preferably forms at least a part of the circumference centered on the second swing axis A2. That is, the inner surface 31g of the axial center recess 31f preferably has an inner side surface 31h on the radially inner side with respect to the second swing axis A2, an inner side surface 31i on the radially outer side, and a connection surface 31j. The connection surface 31j connects the inner side surface 31h and the inner side surface 31i. The inner surface 31g of the axial center recess 31f comes into contact with the axial center protrusion 71. Therefore, the axial center protrusion 71 can be held by the inner side surface 31i and the inner side surface 31h of the axial center recess 31f. Thus, the movable body 2 can be more stably swung with respect to the support body 3 as compared with a case where the axial center recess 31f does not have the inner side surface 31h. Note that the axial center recess 31f does not necessarily have the inner side surface 31h. In other words, the entire region surrounded by the inner side surface 31i may be recessed to the other side X2 in the first direction X.

Further, the support body 31 preferably has an accommodating recess 31k. The accommodating recess 31k accommodates a magnetic member 141 of the second preload portion 140.

As illustrated in FIGS. 11 and 12, the support body 3 includes the second support portion 60, the axial center protrusion 71, and a magnetic member 73. The support body 3 preferably has an opposing surface 61a and an accommodating recess 61d.

Specifically, the second support portion 60 supports the first support portion 30 so as to be swingable about the second swing axis A2. Further, the second support portion 60 supports the first support portion 30 in the first direction X. Therefore, the first support portion 30 can be easily swung about the second swing axis A2 extending along the first direction X.

The second support portion 60 includes a support body 61, a pair of side surface portions 62, and a back surface portion 63. The support body 61 has the opposing surface 61a, at least three accommodating recesses 61b, at least three circular protrusions 61c, a plurality of accommodating recesses 61d, and an accommodating recess 61f. In the present embodiment, the support body 61 has three accommodating recesses 61b, three circular protrusions 61c, and two accommodating recesses 61d.

The opposing surface 61a opposes the lower opposing surface 31e of the first support portion 30 in the first direction X. The accommodating recess 61b, the circular protrusion 61c, the accommodating recess 61d, and the accommodating recess 61f are arranged on the opposing surface 61a. The accommodating recess 61b, the accommodating recess 61d, and the accommodating recess 61f are recessed in a direction opposite to the movable body 2 in the first direction X. That is, the accommodating recess 61b, the accommodating recess 61d, and the accommodating recess 61f are recessed to the one side X1 in the first direction X. The accommodating recess 61b opposes the axial center recess 31f of the first support portion 30 in the first direction X. That is, the accommodating recesses 61b are arranged on the same circumference C (see FIG. 13) centered on the second swing axis A2. The accommodating recess 61b accommodates a part of the axial center protrusion 71. Therefore, the at least three axial center protrusions 71 are arranged on the same circumference C centered on the second swing axis A2. The axial center protrusion 71 protrudes in an axial direction of the second swing axis A2. Therefore, the at least three axial center protrusions 71 protruding in the axial direction of the second swing axis A2 come into contact with the movable body 2. Thus, the movable body 2 can be more stably swung with respect to the support body 3. Note that the axial direction of the second swing axis A2 is a direction along the first direction X.

Further, one accommodating recess 61b is arranged at a position farthest from the optical element 10 on the same circumference. On the other hand, two accommodating recesses 61b are arranged at positions closer to the optical element 10 than the one accommodating recess 61b in the state of being arranged in the third direction Z.

The accommodating recess 61b holds a part of the axial center protrusion 71. The circular protrusion 61c protrudes toward the first support portion 30. Since the circular protrusion 61c protrudes from the opposing surface 61a, the depth of the accommodating recess 61b can be increased. In the present embodiment, the lower half of the axial center protrusion 71 is arranged in the accommodating recess 61b. The axial center protrusion 71 has at least a part of a spherical surface. Therefore, the axial center protrusion 71 is in point contact with the axial center recess 31f, and thus, the movable body 2 can be smoothly movable with respect to the support body 3. The axial center protrusion 71 is a sphere in the present embodiment. The axial center protrusion 71 is rotatable inside the accommodating recess 61b. Therefore, the friction between the axial center protrusion 71 and the axial center recess 31f of the first support portion 30 becomes rolling friction, and thus, an effect of the rolling friction can also be obtained.

Further, a material of the axial center protrusion 71 is ceramic. Therefore, the axial center protrusion 71 is non-magnetic, and thus, is not affected by a magnet. Further, the axial center protrusion 71 can be prevented from wearing. Note that the material of the axial center protrusion 71 may be metal. Even in this case, the axial center protrusion 71 can be prevented from wearing. Further, the entire axial center protrusion 71 may be made of metal, or only the surface of the axial center protrusion 71 may be formed using metal by plating, for example.

Further, the at least three axial center protrusions 71 are arranged to be separated from each other on the same circumference C centered on the second swing axis A2. Therefore, the movable body 2 can be supported over a wider range, for example, as compared with a case where the three axial center protrusions 71 are not separated.

Further, the at least three axial center protrusions 71 are arranged in at least three predetermined positions, respectively, on the same circumference C centered on the second swing axis A2. Therefore, the position of the axial center protrusion 71 does not move with respect to one of the movable body 2 and the support body 3. Thus, the movable body 2 can be more stably swung with respect to the support body 3. In the present embodiment, the position of the axial center protrusion 71 does not move with respect to the support body 3.

Further, the two axial center protrusions 71 are arranged side by side in the third direction Z. The remaining axial center protrusion 71 is arranged on the circumference C having the two axial center protrusions 71 as both ends of the diameter. Therefore, the optical element 10 can be prevented from coming into contact with the axial center protrusion 71. That is, a space for arranging the optical element 10 can be secured.

Further a triangle having the two axial center protrusions 71 and the remaining axial center protrusion 71 as vertices is a right triangle. An inner angle of the remaining axial center protrusion 71 is about 90 degrees.

Further, the axial center protrusion 71 is arranged on the one side X1 in the first direction X with respect to the reflective surface 13 of the optical element 10. Therefore, the axial center protrusion 71 can be arranged without blocking the optical path.

The accommodating recess 61d opposes the second magnet 121 of the second swing mechanism 120. The accommodating recess 61d accommodates the magnetic member 73. The accommodating recess 61d has a substantially rectangular shape. The magnetic member 73 has a rectangular shape. The accommodating recess 61d has an expansion portion 61e that expands in a direction away from a corner portion of the magnetic member 73. Therefore, the corner portion of the magnetic member 73 can be prevented from coming into contact with an inner side surface of the accommodating recess 61d. Thus, it is possible to suppress chipping of the corner portion of the magnetic member 73.

The magnetic member 73 is a plate-like member made of a magnetic material. The magnetic member 73 is arranged on the one side X1 in the first direction X with respect to the second magnet 121. Since a force (hereinafter, also referred to as an attractive force) attracting each other acts on the second magnet 121 and the magnetic member 73, the movable body 2 can be prevented from being displaced in the first direction X with respect to the support body 3. Since the second magnet 121 of the second swing mechanism 120 is used, it is possible to suppress an increase in the number of components. Note that the action of suppressing the movable body 2 from being displaced in the first direction X with respect to the support body 3 is similar to the action of the magnetic member 141 and the third magnet 142 of the second pre-load portion 140 as will be described later. Therefore, the magnetic member 141 and the third magnet 142 of the second pre-load portion 140 can be downsized.

Figure 14:
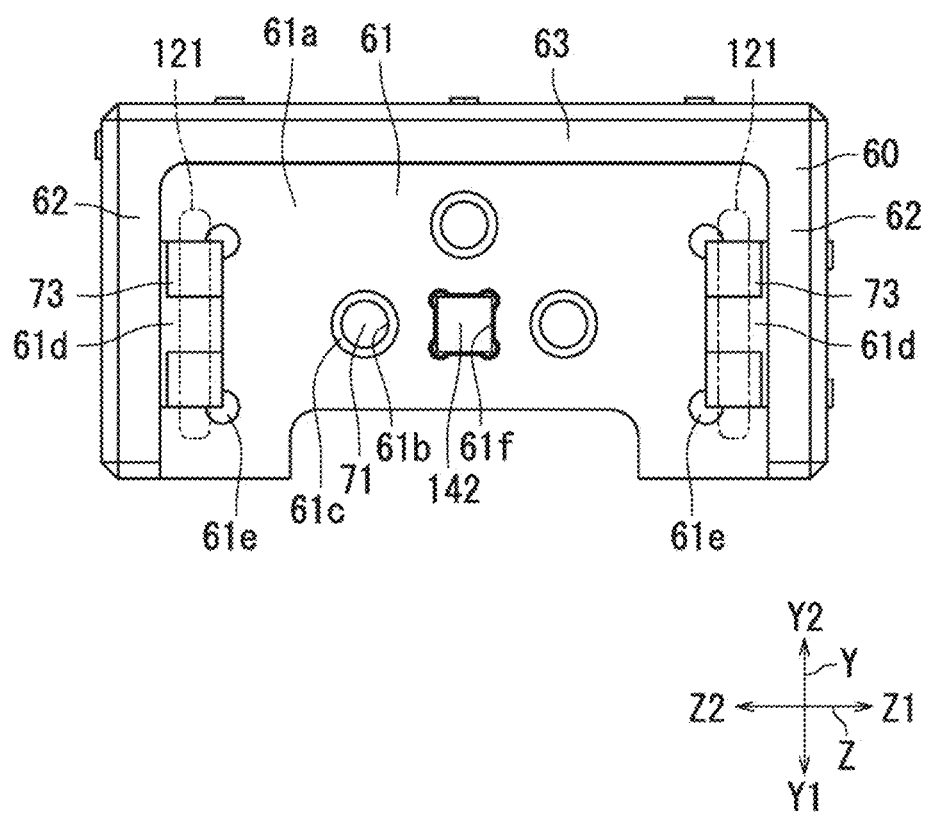
FIG. 14 is a view illustrating the second support portion, an axial center protrusion, the second magnet, and a third magnet of the optical unit according to the present embodiment viewed from the other side X2 in the first direction X.

FIG. 14 is a view illustrating the second support portion 60, the axial center protrusion 71, the second magnet 121, and the third magnet 142 of the optical unit 1 according to the present embodiment viewed from the other side X2 in the first direction X. As illustrated in FIGS. 5C and 14, the second magnet 121 and the magnetic member 73 overlap when viewed from a direction perpendicular to a direction in which the second magnet 121 and the second coil 125 oppose each other. In the present embodiment, the second magnet 121 and the magnetic member 73 overlap when viewed from the first direction X. That is, the magnetic member 73 is arranged on the one side X1 in the first direction X with respect to a surface 121f on the one side X1 in the first direction X out of a peripheral surface 121e of the second magnet 121. The surface 121f is a lower surface of the magnetic member 73. A detailed structure of the second magnet 121 will be described later.

In the present embodiment, two magnetic members 73 are arranged in each of the accommodating recesses 61d. In other words, the magnetic member 73 is arranged to be separated in a polarized direction of the second magnet 121 of the second swing mechanism 120. Therefore, an area of the second magnet 121 is smaller than that in a case where the second magnet 121 is not separated. Note that the second magnet 121 is polarized in the second direction Y as illustrated in FIG. 7. Here, when the movable body 2 swung by the second swing mechanism 120, a force acts on the movable body 2 in a direction of returning to a reference position due to the attractive force between the second magnet 121 and the magnetic member 73. As illustrated in FIG. 5B, the reference position is a position where the side surface portion 32 of the first support portion 30 and the side surface portion 62 of the second support portion 60 are parallel to each other. The force acting on the movable body 2 in the direction of returning to the reference position decreases as an area of the magnetic member 73 decreases. Therefore, the magnetic force acting on the movable body 2 in the direction of returning to the reference position can be reduced when the movable body 2 is swung by the second swing mechanism 120.

The accommodating recess 61f is arranged on the second swing axis A2. The accommodating recess 61f accommodates the third magnet 142 of the second pre-load portion 140 of the first support portion 30. Therefore, the third magnet 142 opposes the magnetic member 141 of the second pre-load portion 140 in the first direction X. The accommodating recess 61f has a substantially rectangular shape. The third magnet 142 has a rectangular shape. The accommodating recess 61f has an expansion portion 61g. The expansion portion 61g expands in a direction away from a corner portion of the third magnet 142. Therefore, the corner portion of the third magnet 142 can be prevented from coming into contact with an inner side surface of the accommodating recess 61f. Thus, it is possible to suppress chipping of the corner portion of the third magnet 142.

As illustrated in FIGS. 12 and 14, the pair of side surface portions 62 are arranged at both ends of the support body 61 in the third direction Z. The pair of side surface portions 62 have shapes symmetrical to each other in the third direction Z. The side surface portion 62 has an accommodating hole 62a in which the second coil 125 of the second swing mechanism 120 is arranged. The accommodating hole 62a penetrates the side surface portion 62 in the thickness direction. That is, the accommodating hole 62a penetrates the side surface portion 62 in the third direction Z.

The back surface portion 63 is arranged at an end of the support body 61 on the other side Y2 in the second direction Y. The back surface portion 63 has an accommodating hole 63a in which a first coil 115 of the first swing mechanism 110 is arranged. The accommodating hole 63a penetrates the back surface portion 63 in the thickness direction. That is, the accommodating hole 63a penetrates the back surface portion 63 in the second direction Y.

The FPC 80 is arranged so as to cover the outside of the pair of side surface portions 62 and the outside of the back surface portion 63. The FPC 80 includes, for example, a semiconductor element, a connection terminal, and a wiring. The FPC 80 supplies power to the first coil 115 of the first swing mechanism 110 and the second coil 125 of the second swing mechanism 120 at a predetermined timing.

Specifically, as illustrated in FIG. 11, the FPC 80 includes a substrate 81, a connection terminal 82, a reinforcing plate 83, and a magnetic member 84. The substrate 81 is made of, for example, a polyimide substrate. The substrate 81 has flexibility. The substrate 81 has a plurality of pin insertion holes 81a. The pin insertion holes 81a oppose the first coil 115 and the second coil 125. A coil pin of the first coil 115 or a coil pin (not illustrated) of the second coil 125 is arranged in each of the pin insertion holes 81a.

The connection terminal 82 is arranged on the substrate 81. The connection terminal 82 opposes the first swing mechanism 110 and the second swing mechanism 120. The connection terminal 82 is electrically connected to a terminal of a Hall element (not illustrated). Note that, for example, four connection terminals 82 are arranged for one Hall element. Three reinforcing plates 83 are arranged on the substrate 81. The reinforcing plates 83 oppose the first swing mechanism 110 and the second swing mechanism 120. The reinforcing plate 83 suppresses bending of the substrate 81.

Three magnetic members 84 are arranged on the substrate 81. The two magnetic members 84 oppose the second magnet 121 of the second swing mechanism 120. In a state in which the second coil 125 is not energized, an attractive force is generated between the second magnet 121 and the magnetic member 84. Thus, the movable body 2 is arranged at the reference position in a rotation direction about the second swing axis A2. Further, the remaining one magnetic member 84 opposes the first magnet 111 of the first swing mechanism 110. In a state in which the first coil 115 is not energized, an attractive force is generated between the first magnet 111 and the magnetic member 84. Thus, the movable body 2 is arranged at the reference position in a rotation direction about the first swing axis A1. Note that the reference position be described later.

As illustrated in FIGS. 5A to 5C, the first swing mechanism 110 swings the holder 20 about the first swing axis A1 with respect to the first support portion 30. The first swing mechanism 110 includes the first magnet 111 and the first coil 115. The first coil 115 opposes the first magnet 111 in the second direction Y.

The first magnet 111 is arranged on one of the holder 20 and the second support portion 60. On the other hand, the first coil 115 is arranged on the other of the holder 20 and the second support portion 60. In the present embodiment, the first magnet 111 is arranged on the holder 20. The first coil 115 is arranged on the second support portion 60. Therefore, a force acts on the first magnet 111 due to a magnetic field generated when a current flows through the first coil 115. Then, the holder 20 swings with respect to first support portion 30. Thus, the holder 20 can be swung with a simple configuration using the first magnet 111 and the first coil 115. Since the first coil 115 is arranged on second support portion 60, the first coil 115 does not swing with respect to the second support portion 60. Therefore, the wiring can be easily performed on the first coil 115 as compared with a case where the first coil 115 is arranged on the first support portion 30, for example.

Specifically, the first magnet 111 is arranged on the back surface 21b of the holder 20. That is, the first magnet 111 is arranged at an end 20a of the holder 20 on the other side Y2 in the second direction Y. The first magnet 111 includes an n-pole portion 111a formed of an n pole and an s-pole portion 111b formed of an s pole. The first magnet 111 is polarized in the first direction X.

The first coil 115 is arranged in the accommodating hole 63a of the back surface portion 63 of the second support portion 60. That is, the first coil 115 is arranged at an end 60a of the second support portion 60 on the other side Y2 in the second direction Y. Therefore, it is possible to prevent the first coil 115 and the first magnet 111 from being arranged on the optical path. Thus, it is possible to prevent the optical path from being blocked by the first coil 115 and the first magnet 111.

When the first coil 115 is energized, a magnetic field is generated around the first coil 115. Then, a force caused by the magnetic field acts on the first magnet 111. As a result, the holder 20 and the optical element 10 swing about the first swing axis A1 with respect to the first support portion 30 and the second support portion 60.

Since the first magnet 111 and the first coil 115 of the first swing mechanism 110 are arranged along the second direction Y, the first magnet 111 and the first coil 115 attract each other an the second direction Y. Therefore, it is possible to suppress the holder 20 from coming off to the one side Y1 in the second direction Y by a force by which the first magnet 111 and the first coil 115 attract each other in the second direction Y.

The second swing mechanism 120 swings the first support portion 30 about the second swing axis A2 with respect to the second support portion 60. The second swing mechanism 120 includes the second magnet 121 and the second coil 125. The second magnet 121 is arranged on one of the first support portion 30 and the second support portion 60. On the other hand, the second coil 125 is arranged on the other of the first support portion 30 and the second support portion 60. In the present embodiment, the second magnet 121 is arranged on the first support portion 30. The second coil 125 is arranged on the second support portion 60. Therefore, the first support portion 30 swings with respect to the second support portion 60 by a magnetic field generated when a current flows through the second coil 125. Thus, the first support portion 30 can be swung with a simple configuration using the second magnet 121 and the second coil 125. Since the second coil 125 is arranged on second support portion 60, the second coil 125 does not swing with respect to the second support portion 60. Therefore, the wiring can be easily performed on the second coil 125 as compared with a case where the second coil 125 is arranged on the first support portion 30, for example.

Specifically, the second magnet 121 is arranged in the accommodating recess 32d (see FIG. 7) of the side surface portion 32 of the first support portion 30. That is, the second magnet 121 is arranged at an end 30a of the first support portion 30 in a direction intersecting the first direction X. In the present embodiment, the second magnet 121 is arranged at the end 30a in the third direction Z. The second magnet 121 includes an n-pole portion 121a formed of an n pole and an s-pole portion 121b formed of an s pole. The second magnet 121 is polarized in the second direction Y intersecting the first direction X. Therefore, the movable body 2 can be swung about the second swing axis A2 along the incident direction of light.

The second magnet 121 has a coil opposing surface 121c, an inner side surface 121d, and a peripheral surface 121e. The coil opposing surface 121c opposes the second coil 125. The inner side surface 121d is arranged on a side opposite to the coil opposing surface 121c. The peripheral surface 121e is connected to the coil opposing surface 121c. The peripheral surface 121e is also connected to the inner side surface 121d. The peripheral surface 121e is arranged over one circumference around the coil opposing surface 121c and the inner side surface 121d.

The second coil 125 opposes the second magnet 121 in the third direction Z. The second coil 125 is arranged in the accommodating hole 62a (see FIG. 12) of the side surface portion 62 of the second support portion 60. That is, the second coil 125 is arranged at an end 60b of the second support portion 60 in the third direction Z.

When the second coil 125 is energized, a magnetic field is generated around the second coil 125. Then, a force caused by the magnetic field acts on the second magnet 121. As a result, the first support portion 30, the holder 20, and the optical element 10 swing about the second swing axis A2 with respect to the second support portion 60.

When the optical unit 1 is used for the smartphone 200 as illustrated in FIG. 1, a Hall element (not illustrated) in the smartphone 200 detects the orientation of the smartphone 200. Then, the first swing mechanism 110 and the second swing mechanism 120 are controlled according to the orientation of the smartphone 200. Further, it is preferable that the orientation of the holder 20 with respect to the second support portion 60 be detectable. In this case, the orientation of the holder 20 with respect to the second support portion 60 can be controlled with high accuracy. Note that, for example, a gyro sensor may be used as a sensor that detects the orientation of the smartphone 200.

The second pre-load portion 140 is arranged on at least one of the movable body 2 and the support body 3. The second pre-load portion 140 applies a pre-load to at least the other of the movable body 2 and the support body 3 in the axial direction of the second swing axis A2. In the present embodiment, the second pre-load portion 140 is arranged on at least one of the first support portion 30 and the second support portion 60. The second pre-load portion 140 applies a pre-load to at least the other of the first support portion 30 and the second support portion 60 in the axial direction of the second swing axis A2. Therefore, the first support portion 30 can be prevented from being displaced in the axial direction of the second swing axis A2 with respect to the second support portion 60.

Specifically, the second pre-load portion 140 includes the magnetic member 141 and the third magnet 142. The third magnet 142 is arranged on one of the movable body 2 and the support body 3. The magnetic member 141 is arranged on the other of the movable body 2 and the support body 3. In the present embodiment, the third magnet 142 is arranged on one of the first support portion 30 and the second support portion 60. The magnetic member 141 is arranged on the other of the first support portion 30 and the second support portion 60. Therefore, a force attracting each other acts on the third magnet 142 and the magnetic member 141, and thus, the pre-load can be applied to at least the other of the first support portion 30 and the second support portion 60 in the axial direction of the second swing axis A2. Further, the pre-load can be applied to at least the other of the movable body 2 and the support body 3 in the axial direction of the second swing axis A2 with a simple configuration using the third magnet 142 and the magnetic member 141. More specifically, the third magnet 142 is arranged on the second support portion 60. The magnetic member 141 is arranged on the first support portion 30. Therefore, the pre-load can be applied to the first support portion 30 in the axial direction of the second swing axis A2.

The magnetic member 141 is a plate-like member made of a magnetic material. The magnetic member 141 is arranged in an accommodating recess 31k of the first support portion 30. The third magnet 142 is arranged in the accommodating recess 61f of the second support portion 60. The magnetic member 141 opposes the third magnet 142 in the first direction X. Therefore, the force attracting each other acts between the magnetic member 141 and the third magnet 142.

The third magnet 142 and the magnetic member 141 are arranged on the second swing axis A2. Therefore, it is possible to suppress a change in the positional relationship between the third magnet 142 and the magnetic member 141 when the movable body 2 swings about the second swing axis A2. Thus, it is possible to prevent a variation in the force attracting each other that acts between the third magnet 142 and the magnetic member 141.

Hereinafter, first to seventh modifications of the present embodiment will be described with reference to FIGS. 15 to 22. Hereinafter, differences from the present embodiment illustrated in FIGS. 1 to 14 will be mainly described.

Figure 15:
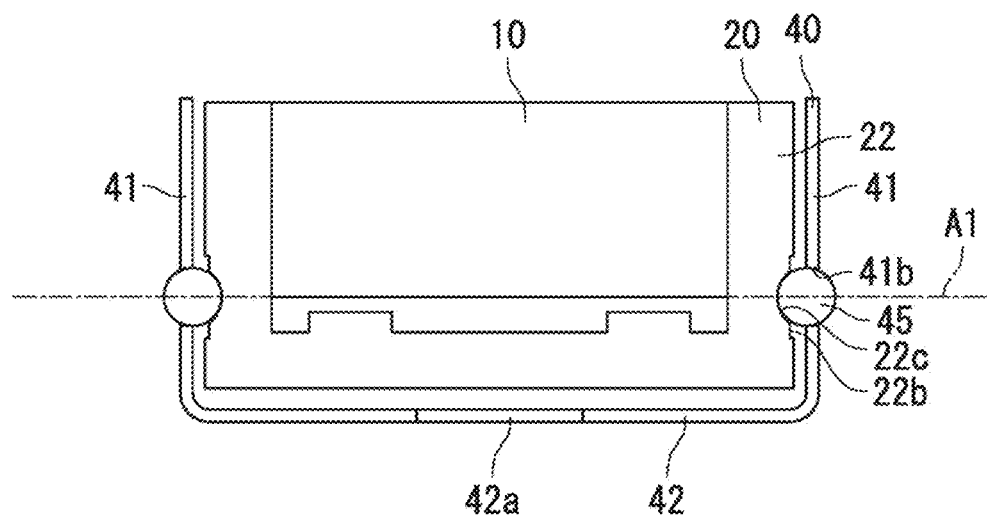
FIG. 15 is a cross-sectional view illustrating a structure of the periphery of a first pre-load portion of an optical unit according to a first modification of the present embodiment.

The first modification of the embodiment of the present disclosure will be described with reference to FIG. 15. In the first modification, a case where an axial protrusion 45 of the first pre-load portion 40 is formed of a sphere will be described. As illustrated in FIG. 15, the pair of side surface portions 41 of the first pre-load portion 40 have the axial protrusions 45. The axial protrusion 45 protrudes toward the holder 20 on the first swing axis A1. The axial protrusion 45 is formed of the sphere.

The side surface portion 41 has a through-hole 41b. The through-hole 41b penetrates the side surface portion 41 in the thickness direction. That is, the through-hole 41b penetrates the side surface portion 41 in the third direction Z. The through-hole 41b is arranged on the first swing axis A1. The axial protrusion 45 is fixed to the through-hole 41b. The axial protrusion 45 may be fitted to the through-hole 41b. Further, the axial protrusion 45 may be fixed to the through-hole 41b using, for example, an adhesive. A part of the axial protrusion 45 is accommodated in the axial recess 22c. Then, the axial protrusion 45 and the axial recess 22c are in point contact with each other.

Figure 16:
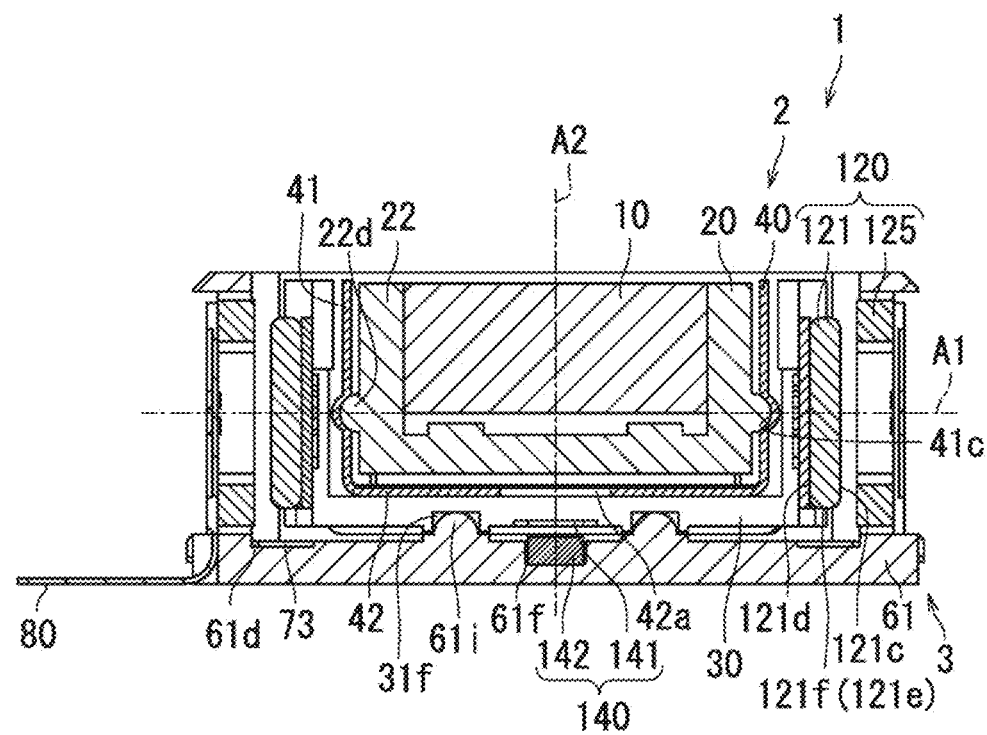
FIG. 16 is a cross-sectional view illustrating an optical unit according to a second modification of the present embodiment.

The second modification of the embodiment of the present disclosure will be described with reference to FIG. 16. In the second modification, a case where the holder 20 has an axial protrusion 22d will be described. FIG. 16 is a cross-sectional view illustrating the optical unit 1 according to the second modification of the present embodiment. As illustrated in FIG. 16, the pair of side surface portions 22 of the holder 20 have the axial protrusions 22d. The axial protrusion 22d protrudes toward the first pre-load portion 40 on the first swing axis A1. The axial protrusion 22d has a part of a spherical surface. The axial protrusion 22d has, for example, a hemispherical shape.

The pair of side surface portions 41 of the first pre-load portion 40 have axial recesses 41c. The axial recess 41c is recessed to a side opposite to the holder 20. The axial recess 41c is arranged on the first swing axis A1. The axial recess 41c has a part of a concave-shaped spherical surface. A part of the axial protrusion 22d is accommodated in the axial recess 41c. Then, the axial protrusion 22d and the axial recess 41c are in point contact with each other.

Note that the example in which the axial center protrusion 71 is the sphere and the axial center protrusion 71 is arranged in the accommodating recess 61b has been described in the embodiment illustrated in FIGS. 1 to 14, but the present disclosure is not limited to this example. That is, an axial center protrusion 61i may be formed of the single member with a member forming the support body 3 as illustrated in FIG. 16. More specifically, the axial center protrusion 61i and the second support portion 60 may be formed of the single member. Further, the axial center protrusion may be formed of the single member with a member forming the movable body 2. The axial center protrusion 61i may have, for example, a hemispherical shape. Further, the axial center protrusion 61i may have, for example, a shape in which a distal end of a cylinder is formed in a hemispherical shape.

Figure 17:
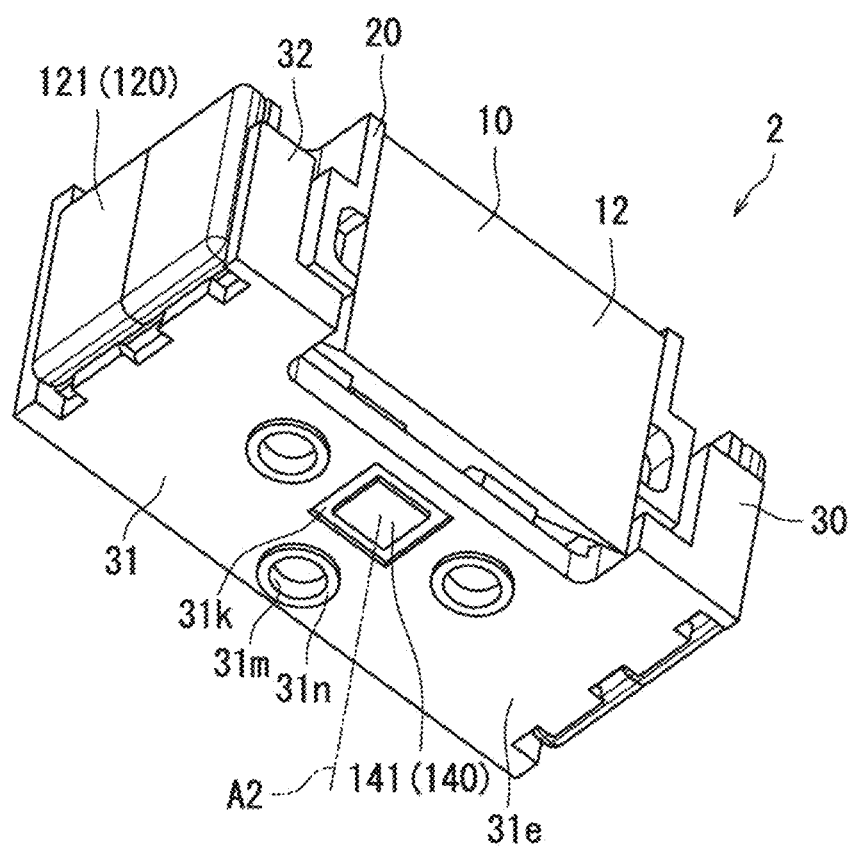
FIG. 17 is a perspective view illustrating a movable body of an optical unit according to a third modification of the present embodiment.
Figure 17:
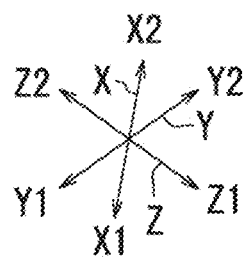
Figure 18:
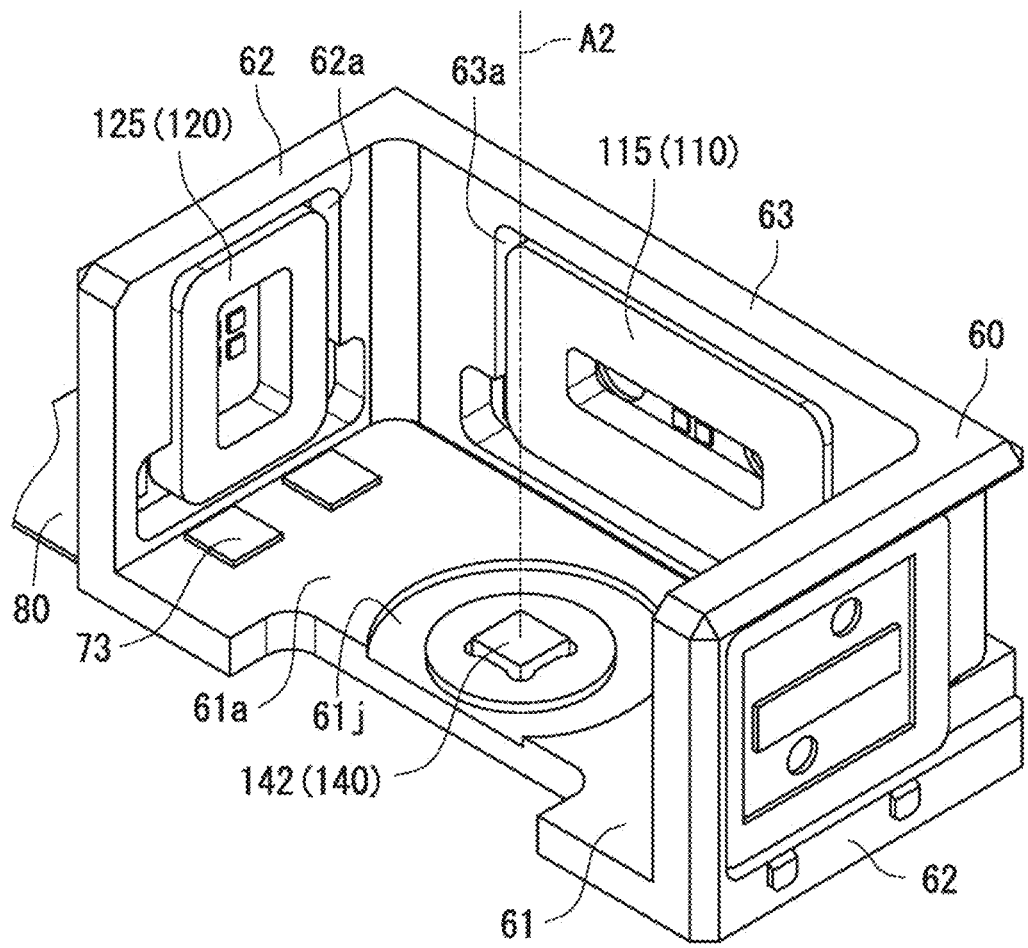
FIG. 18 is a perspective view illustrating a support body of the optical unit according to the third modification of the present embodiment.
Figure 18:
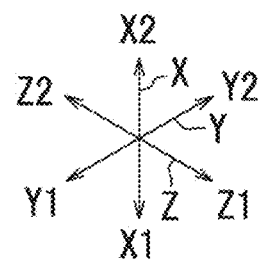

The third modification of the embodiment of the present disclosure will be described with reference to FIGS. 17 and 18. In the third modification, a case where the movable body 2 has the axial center protrusion 71 and the support body 3 has an axial center recess 61j will be described. FIG. 17 is a perspective view illustrating the movable body 2 of the optical unit 1 according to the third modification of the present embodiment. FIG. 18 is a perspective view illustrating the support body 3 of the optical unit 1 according to the third modification of the present embodiment.

As illustrated in FIG. 17, the first support portion 30 has at least three axial center protrusions 71 protruding toward the second support portion 60. Specifically, the support body 31 of the support portion 30 has at least three accommodating recesses 31m and at least three circular protrusions 31n. In the third modification, each of the number of the axial center protrusions 71, the number of the accommodating recesses 31m, and the number of the circular protrusions 31n is three. The accommodating recess 31m and the circular protrusion 31n are arranged on the lower opposing surface 31e. The accommodating recess 31m is arranged on the same circumference centered on the second swing axis A2. The accommodating recess 31m accommodates a part of the axial center protrusion 71. Therefore, the axial center protrusion 71 is arranged on the same circumference centered on the second swing axis A2. The axial center protrusion 71 protrudes in an axial direction of the second swing axis A2.

As illustrated in FIG. 18, the second support portion 60 has the axial center recess 61j. The axial center recess 61j is recessed in a direction opposite to the axis center protrusion 71. Specifically, the support body 61 of the second support portion 60 has the axial center recess 61j. The axial center recess 61 is arranged on the opposing surface 61a. The axial center recess 61j forms at least a part of a circle centered on the second swing axis A2.

In the third modification, the axial center protrusion 71 moves along an inner surface of the axial center recess 61j. Therefore, the first support portion 30 can be stably swung with respect to the second support portion 60 about the second swing axis A2, which is similar to the embodiment illustrated in FIGS. 1 to 14.

Note that the example in which the magnetic member 73 is arranged in the accommodating recess 61d has been described in the embodiment illustrated in FIGS. 1 to 14, but the present disclosure is not limited to this example. That is, the second support portion 60 does not necessarily have the accommodating recess 61d as illustrated in FIG. 18. In this case, the magnetic member 73 may be arranged on the opposing surface 61a of the second support portion 60.

Figure 19:
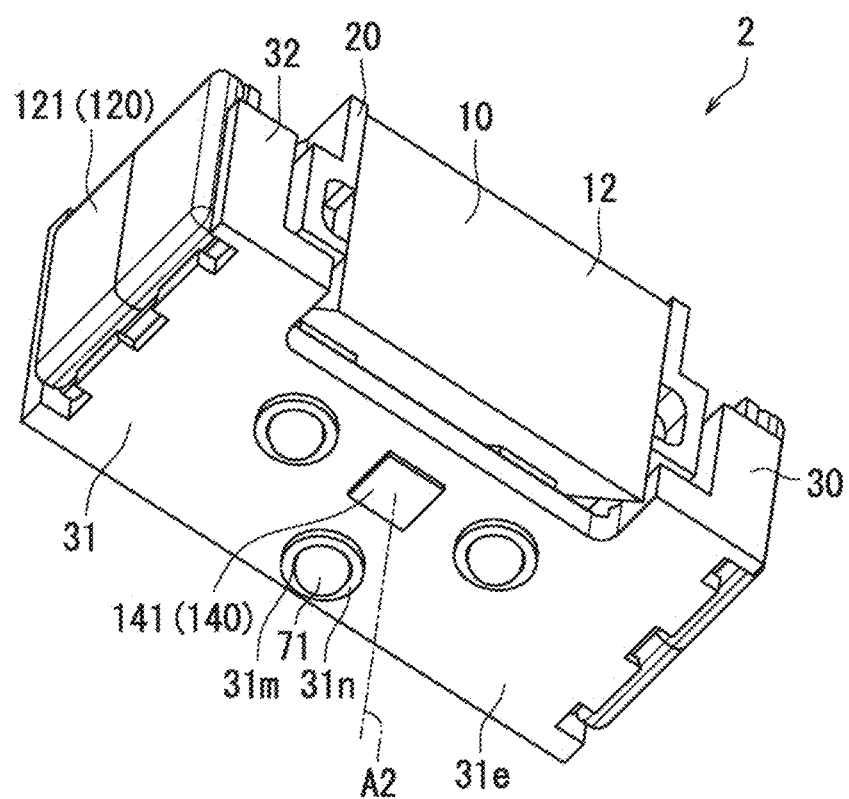
FIG. 19 is a perspective view illustrating a movable body of an optical unit according to a fourth modification of the present embodiment.
Figure 19:
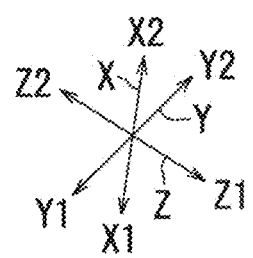

The fourth modification of the embodiment of the present disclosure will be described with reference to FIG. 19. FIG. 19 is a perspective view illustrating the movable body 2 of the optical unit 1 according to the fourth modification of the present embodiment. As illustrated in FIG. 19, the support body 31 of the first support portion 30 does not include the accommodating recess 31k in the fourth modification. Then, the magnetic member 141 of the second pre-load portion 140 is arranged on the lower opposing surface 31e of the support body 31.

Figure 20:
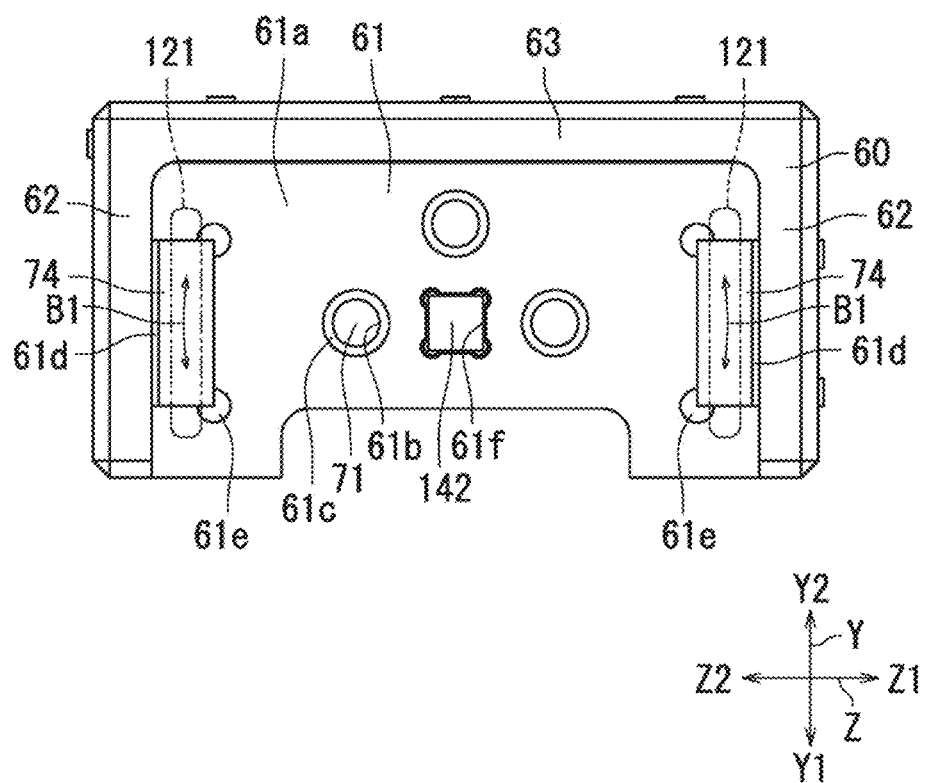
FIG. 20 is a view illustrating a second support portion, an axial center protrusion, a second magnet, and a third magnet of an optical unit according to a fifth modification of the present embodiment viewed from the other side X2 in the first direction X.

The fifth modification of the embodiment of the present disclosure will be described with reference to FIG. 20. In the fifth modification, a case where the magnetic member 74 extends along a swing direction of the second magnet 121 will be described. FIG. 20 is a view illustrating the second support portion 60, the axial center protrusion 71, the second magnet 121, and the third magnet 142 of the optical unit 1 according to the fifth modification of the present embodiment viewed from the other side X2 in the first direction X.

As illustrated in FIG. 20, only one magnetic member 74 is arranged for one second magnet 121, which is different from the magnetic member 73 of the embodiment lustrated in FIGS. 1 to 14. The magnetic member 74 extends along a swing direction B1 of the second magnet 121. Therefore, an attractive force acting between the second magnet 121 and the magnetic member 74 can be increased.

Figure 21:
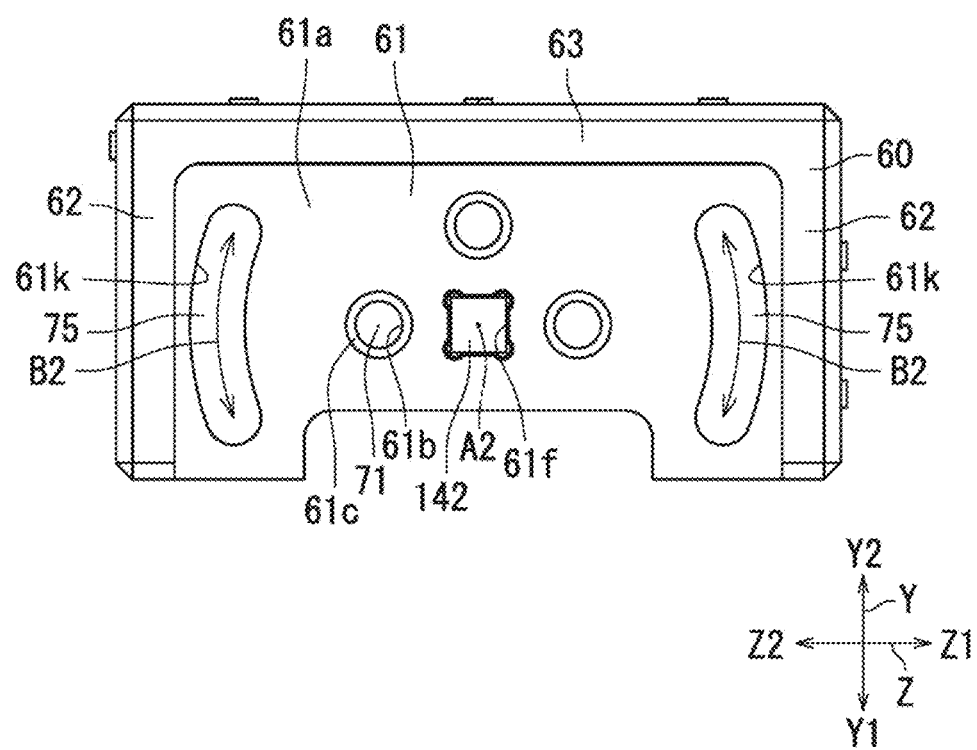
FIG. 21 is a view illustrating a second support portion, an axial center protrusion, and a third magnet of an optical unit according to a sixth modification of the present embodiment viewed from the other side X2 in the first direction X.

The sixth modification of the embodiment of the present disclosure will be described with reference to FIG. 21. In the sixth modification, a case where the magnetic member 75 has an arc shape centered on the second swing axis A2 will be described. FIG. 21 is a view illustrating the second support portion 60, the axial center protrusion 71, and the third magnet 142 of the optical unit 1 according to the sixth modification of the present embodiment viewed from the other side X2 in the first direction X. As illustrated in FIG. 21, the magnetic member 75 extends along the swing direction of the second magnet 121, which is similar to the fifth modification. Furthermore, the magnetic member 75 has the arc shape centered on the second swing axis A2. An accommodating recess 61k has an arc shape centered on the second swing axis A2, which is different from the accommodating recess 61d of the embodiment illustrated in FIGS. 1 to 14. That is, the magnetic member 75 and the accommodating recess 61k are curved along the direction B2.

Therefore, it is possible to suppress a change in an overlapping area between the second magnet 121 and the magnetic member 75 in the axial direction of the second swing axis A2 when the movable body 2 is swung about the second swing axis A2. Thus, it is possible to prevent a variation in the force attracting each other that acts between the second magnet 121 and the magnetic member 75.

Figure 22:
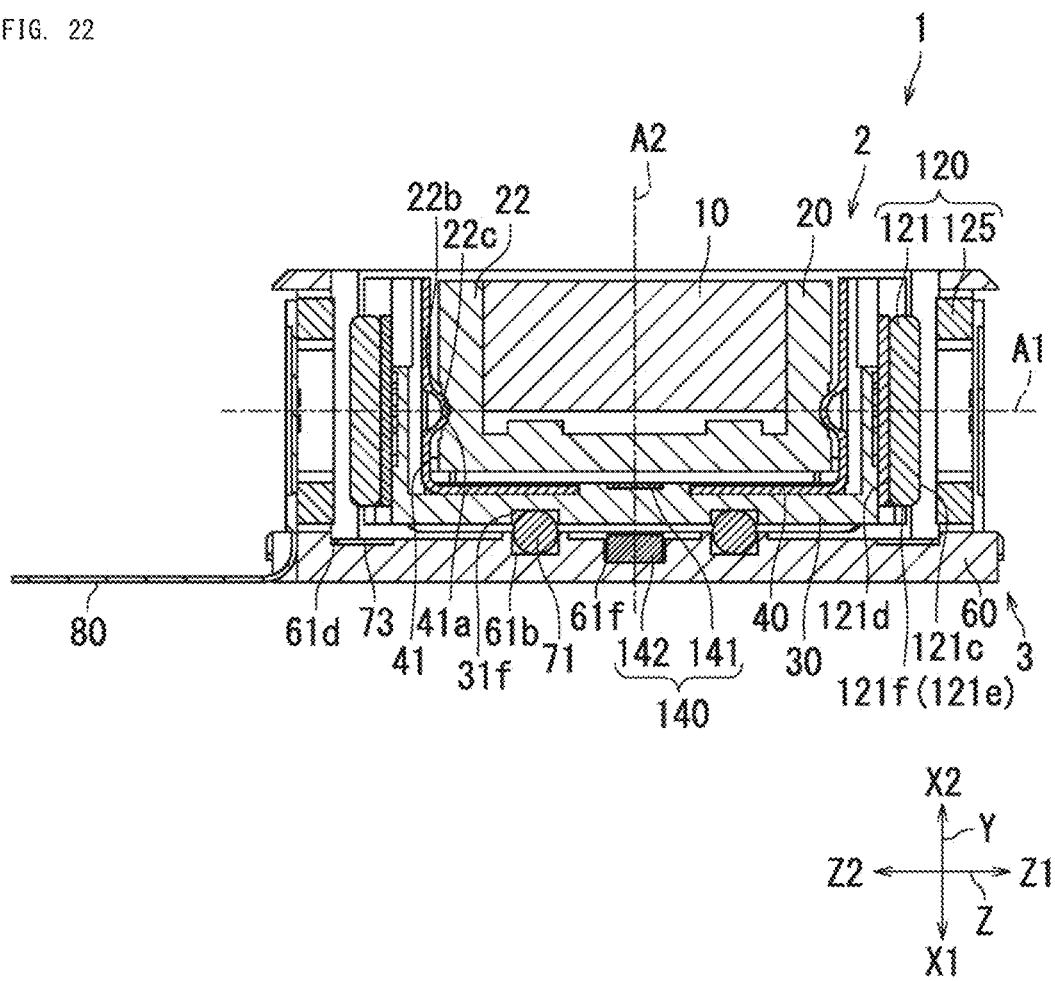
FIG. 22 is a cross-sectional view illustrating an optical unit according to a seventh modification of the present embodiment.

The seventh modification of the embodiment of the present disclosure will be described with reference to FIG. 22. FIG. 22 is a cross-sectional view illustrating the optical unit 1 according to the seventh modification of the present embodiment. As illustrated in FIG. 22, the magnetic member 141 of the second pre-load portion 140 is arranged on a surface of the first support portion 30 facing the holder 20 in the seventh modification. That is, the magnetic member 141 is arranged on the surface of the first support portion 30 on the other side X2 in the first direction X.

Therefore, the magnetic member 141 presses the first support portion 30 toward the second support portion 60 by an attractive force between the magnetic member 141 and the third magnet 142. Thus, it is unnecessary to fix the magnetic member 141 to the first support portion 30 using, for example, an adhesive.

Note that the example in which the optical element 10 includes the prism has been described in the embodiment illustrated in FIGS. 1 to 14, but the present disclosure is not limited to this example. For example, a thin sheet-shaped reflection member (for example, a mirror) may be used as the optical element 10.

Further, the example in which the first pre-load portion 40 is arranged on the first support portion 30 has been described in the embodiment illustrated in FIGS. 1 to 14, but the present disclosure is not limited to this example. A first pre-load portion that applies a pre-load in the axial direction of the first swing axis A1 may be arranged on the holder 20.

The embodiment (including modifications) of the present disclosure has been described above with reference to the drawings. However, the present disclosure is not limited to the above-described embodiments, and can be implemented in various modes without departing from a gist thereof. Further, various disclosures are possible by appropriately combining the plurality of components described in the above embodiment. For example, some components may be removed from all components illustrated in the embodiments. For example, components across different embodiments may be combined as appropriate. The components in the drawings are mainly and schematically illustrated to facilitate better understanding, and the thickness, length, number, spacing, etc. of each component illustrated in the drawings may differ from actual values for the convenience of creating drawings. Further, the material, shape, dimensions, etc. of each component described in the above embodiment are merely examples, and are not particularly limited, and various modifications are possible without substantially departing from the effects of the present disclosure.

The present disclosure can be applied to, for example, an optical unit.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit, comprising:
an optical element that changes a traveling direction of light;
a holder that holds the optical element;
a first support portion that supports the holder so as to be swingable about a first swing axis;
a second support portion that supports the first support portion so as to be swingable about a second swing axis intersecting the first swing axis;
a first swing mechanism that swings the holder about the first swing axis with respect to the first support portion;
a second swing mechanism that swings the first support portion about the second swing axis with respect to the second support portion;
a first pre-load portion that is arranged on at least one of the holder and the first support portion and applies a pre-load in an axial direction of the first swing axis to at least a remaining one of the holder and the first support portion; and
a second pre-load portion that is arranged on at least one of the first support portion and the second support portion and applies a pre-load in an axial direction of the second swing axis to at least a remaining one of the first support portion and the second support portion, wherein
the first swing mechanism includes
a first magnet arranged on the holder, and
a first coil arranged on the second support portion, and
the second swing mechanism includes
a second magnet arranged on the first support portion, and
a second coil arranged on the second support portion.

2. The optical unit according to claim 1, wherein
the optical element has a reflective surface that reflects the light, which travels to one side in a first direction, to one side in a second direction intersecting the first direction,
the first swing axis is an axis extending along a third direction intersecting the first direction and the second direction, and
the second swing axis is an axis extending along the first direction.

3. The optical unit according to claim 2, wherein
the first support portion supports the holder in the third direction, and
the second support portion supports the first support portion in the first direction.

4. The optical unit according to claim 1, wherein
the first pre-load portion is arranged on the first support portion,
the first pre-load portion includes:
a pair of side surface portions sandwiching the holder in the axial direction of the first swing axis; and
a connection portion connecting the pair of side surface portions to each other, and
the pair of side surface portions and the connection portion are formed of a single member.

5. The optical unit according to claim 4, wherein
the pair of side surface portions are inclined with respect to a direction perpendicular to the connection portion, and
a distance between the pair of side surface portions decreases as a distance from the connection portion increases.

6. The optical unit according to claim 4, wherein
one of the first support portion and the connection portion has a fitting protrusion that protrudes toward a remaining one of the first support portion and the connection portion, and
the remaining one of the first support portion and the connection portion has a fitting hole to be fitted to the fitting protrusion.

7. The optical unit according to claim 4, wherein
the optical element has a reflective surface that reflects the light, which travels to one side in a first direction, to one side in a second direction intersecting the first direction,
a side surface portion of the pair of side surface portions has an axial protrusion that protrudes toward the holder on the first swing axis,
the holder has a pair of opposing side surfaces opposing the pair of side surface portions, respectively, a groove arranged in an opposing side surface of the pair of opposing side surfaces, and an axial recess arranged inside the groove,
the groove is recessed toward an inside of the holder and extends to another side in the second direction, and
the axial recess is recessed toward the inside of the holder on the first swing axis and accommodates at least a part of the axial protrusion.

8. The optical unit according to claim 7, wherein
the axial protrusion has at least a part of a spherical surface, and
the axial recess has at least a part of a concave-shaped spherical surface.

9. The optical unit according to claim 1, wherein
the second pre-load portion includes:
a third magnet arranged on one of the first support portion and the second support portion; and
a magnetic member arranged on a remaining one of the first support portion and the second support portion.

10. The optical unit according to claim 1, wherein
the holder has an opposing surface which opposes the optical element, and three support protrusions which protrude from the opposing surface toward the optical element to support the optical element.

11. The optical unit according to claim 1, wherein
the optical element has a reflective surface that reflects the light, which travels to one side in a first direction, to one side in a second direction intersecting the first direction,
the first magnet is arranged at an end of the holder on another side in the second direction,
the first coil is arranged at an end of the second support portion on the other side in the second direction,
the second magnet is arranged at an end of the first support portion in a third direction intersecting the first direction and the second direction, and
the second coil is arranged at an end of the second support portion in the third direction.

12. An optical unit, comprising:

an optical element that changes a traveling direction of light;

a holder that holds the optical element;

a first support portion that supports the holder so as to be swingable about a first swing axis;

a second support portion that supports the first support portion so as to be swingable about a second swing axis intersecting the first swing axis;

a first swing mechanism that swings the holder about the first swing axis with respect to the first support portion; and a second swing mechanism that swings the first support portion about the second swing axis with respect to the second support portion, wherein the first swing mechanism includes
- a first magnet arranged on the holder, and
- a first coil arranged on the second support portion, the second swing mechanism includes
- a second magnet arranged on the first support portion, and
- a second coil arranged on the second support portion, one of the first support portion and the second support portion has at least three axial center protrusions protruding toward a remaining one of the first support portion and the second support portion, the at least three axial center protrusions are arranged on an identical circumference centered on the second swing axis, the remaining one of the first support portion and the second support portion has an axial center recess that is recessed in a direction opposite to an axial center protrusion of the at least three axial center protrusions and forms a part of a circle centered on the second swing axis, and the axial center recess is in contact with the axial center protrusion.

13. The optical unit according to claim 12, wherein the second support portion has the axial center protrusion, and the first support portion has the axial center recess.

* * * * *